(12) United States Patent
Tu et al.

(10) Patent No.: US 12,387,451 B2
(45) Date of Patent: Aug. 12, 2025

(54) IMAGE OBTAINING METHOD AND APPARATUS

(71) Applicant: HUAWEI TECHNOLOGIES CO., LTD., GuangDong (CN)

(72) Inventors: Jiaojiao Tu, Shenzhen (CN); Jing Lan, Shenzhen (CN); Yibo Su, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 351 days.

(21) Appl. No.: 17/886,761

(22) Filed: Aug. 12, 2022

(65) Prior Publication Data

US 2022/0392182 A1 Dec. 8, 2022

Related U.S. Application Data

(63) Continuation of application No. PCT/CN2021/075085, filed on Feb. 3, 2021.

(30) Foreign Application Priority Data

Feb. 14, 2020 (CN) .......................... 202010093488.2

(51) Int. Cl.
*G06V 10/00* (2022.01)
*G06T 7/00* (2017.01)
(Continued)

(52) U.S. Cl.
CPC .......... *G06V 10/141* (2022.01); *G06T 7/0002* (2013.01); *G06V 10/761* (2022.01);
(Continued)

(58) Field of Classification Search
CPC .. G06V 10/141; G06V 10/761; G06V 10/803; G06T 7/0002; G06T 2207/10024;
(Continued)

(56) References Cited

U.S. PATENT DOCUMENTS 9,819,849 B1 11/2017 Rivard et al.
2016/0057367 A1 2/2016 Lee
(Continued)

FOREIGN PATENT DOCUMENTS

CN 101102416 A 1/2008
CN 101872106 A 10/2010
(Continued)

OTHER PUBLICATIONS

CN110784660A (Machine English Translation) (Year: 2020).*
CN109547701A (Machine English Translation) (Year: 2019).*
CN109819172A (Machine English Translation) (Year: 2019).*

*Primary Examiner* — Vu Le
*Assistant Examiner* — Zaid Muhammad Saleh
(74) *Attorney, Agent, or Firm* — Rimon PC

(57) ABSTRACT

This application provides an image obtaining method and apparatus. The image obtaining method according to this application includes: obtaining first original image data, where the first original image data is captured by an image sensor based on an initial visible light exposure parameter and luminous intensity of an infrared illuminator; obtaining a luminance of a visible light image based on the first original image data; adjusting the visible light exposure parameter based on a first difference, where the first difference is a difference between the luminance of the visible light image and preset target luminance of the visible light image; obtaining a luminance of an infrared image based on the first original image data; adjusting the luminous intensity of the infrared illuminator based on a second difference, where the second difference is a difference between the luminance of the infrared image and preset target luminance of the infrared image.

18 Claims, 7 Drawing Sheets

(51) Int. Cl.
*G06V 10/141* (2022.01)
*G06V 10/74* (2022.01)
*G06V 10/80* (2022.01)
*H04N 23/11* (2023.01)

(52) U.S. Cl.
CPC .......... *G06V 10/803* (2022.01); *H04N 23/11* (2023.01); *G06T 2207/10024* (2013.01); *G06T 2207/10048* (2013.01); *G06T 2207/10144* (2013.01); *G06T 2207/10152* (2013.01)

(58) Field of Classification Search
CPC . G06T 2207/10048; G06T 2207/10144; G06T 2207/10152; G06T 5/70; G06T 2207/20221; H04N 23/11; H04N 23/73
See application file for complete search history.

(56) References Cited

U.S. PATENT DOCUMENTS

| | | | |
|---|---|---|---|
| 2016/0198103 A1 | 7/2016 | Tanaka et al. | |
| 2020/0126378 A1* | 4/2020 | Van Cleave | H04N 23/11 |
| 2021/0044763 A1* | 2/2021 | Sun | H04N 23/11 |

FOREIGN PATENT DOCUMENTS

| | | | | | |
|---|---|---|---|---|---|
| CN | 105874779 | A | | 8/2016 | |
| CN | 105959592 | A | | 9/2016 | |
| CN | 107734225 | A | | 2/2018 | |
| CN | 108419062 | A | | 8/2018 | |
| CN | 108737728 | A | | 11/2018 | |
| CN | 108965654 | A | | 12/2018 | |
| CN | 109547701 | A | * | 3/2019 | .......... H04M 1/0264 |
| CN | 109712102 | A | | 5/2019 | |
| CN | 109819172 | A | * | 5/2019 | |
| CN | 109951646 | A | | 6/2019 | |
| CN | 110784660 | A | * | 2/2020 | ......... H04N 5/23219 |
| CN | 112153302 | A | | 12/2020 | |
| WO | 2019071613 | A1 | | 4/2019 | |
| WO | 2019153787 | A1 | | 8/2019 | |

* cited by examiner

| R | G | R | G |
|---|---|---|---|
| IR | B | IR | B |
| R | G | R | G |
| IR | B | IR | B |

FIG. 2a

| G | B | G | B |
|---|---|---|---|
| R | IR | R | IR |
| G | B | G | B |
| R | IR | R | IR |

FIG. 2b

| R | G | B | G |
|---|---|---|---|
| G | IR | G | IR |
| B | G | R | G |
| G | IR | G | IR |

FIG. 3a

| IR | G | IR | G |
|---|---|---|---|
| G | B | G | R |
| IR | G | IR | G |
| G | R | G | B |

FIG. 3b

| R+IR | G+IR | B+IR | G+IR |
| --- | --- | --- | --- |
| G+IR | IR | G+IR | IR |
| B+IR | G+IR | R+IR | G+IR |
| G+IR | IR | G+IR | IR |

IMAGE OBTAINING METHOD AND APPARATUS

CROSS-REFERENCE TO RELATED APPLICATIONS

This application is a continuation of International Application No. PCT/CN2021/075085, filed on Feb. 3, 2021, which claims priority to Chinese Patent Application No. 202010093488.2, filed on Feb. 14, 2020. The disclosures of the aforementioned applications are hereby incorporated by reference in their entireties.

TECHNICAL FIELD

This application relates to image processing technologies, and in particular, to a method for obtaining an image and an apparatus.

BACKGROUND

In low illumination scenarios, the signal-to-noise ratio of a red green blue sensor (RGB sensor) is significantly decreased, details are obviously lost, and image quality sharply deteriorates. To resolve this problem, a two-way fusion technology of visible light and infrared radiation has emerged. This technology may be used to capture a visible light image and an infrared image, extract from the infrared image luminance information of a higher signal-to-noise ratio and better details, extract color information from the visible light image, and fuse the two images to obtain a target image with a low signal-to-noise ratio and better details.

At present, a most commonly used solution is dual sensor fusion. To be specific, one RGB sensor is configured to capture a visible light image, the other infrared sensor is configured to capture an infrared image, and the two images are fused to obtain a target image. Another solution is to use a red greed blue infrared (RGBIR) sensor to capture an RGBIR image, separate an RGB component and an IR component from the RGBIR image, and then fuse the RGB component and the IR component to obtain a target image.

However, in the former solution of the foregoing two solutions, the dual sensor structure has a parallax, and calibration needs to be performed, increasing the complexity of the fusion algorithm and adding design difficulty. In the latter solution, optical splitting needs to be performed, but this cannot separate the RGB component from the IR component; as a result, it is difficult to reproduce color, and the fused image may be blurry.

SUMMARY

This application provides a method of obtaining an image and an apparatus, to improve adjustment efficiency and to obtain a target image with a better signal-to-noise ratio and better details.

According to a first aspect, this application provides a method of obtaining an image. The method includes: obtaining first original image data, where the first original image data is captured by using an image sensor based on an initial visible light exposure parameter and luminous intensity of an infrared illuminator, and the first original image data includes visible light image data and infrared image data; obtaining a luminance of a visible light image based on the first original image data; adjusting the visible light exposure parameter based on a first difference, where the first difference is a difference between the luminance of the visible light image and a preset target luminance of the visible light image; obtaining a luminance of an infrared image based on the first original image data; adjusting the luminous intensity of the infrared illuminator based on a second difference, where the second difference is a difference between the luminance of the infrared image and a preset target luminance of the infrared image; obtaining second original image data, where the second original image data is captured by using the image sensor based on an adjusted visible light exposure parameter and an adjusted luminous intensity of the infrared illuminator; and fusing, based on the visible light image data and the infrared image data in the second original image data, to obtain a target image.

In this application, the first original image data may be captured based on the initial visible light exposure parameter and the luminous intensity of the infrared illuminator, the visible light exposure parameter and the luminous intensity of the infrared illuminator may be separately adjusted based on a visible light component and an infrared component in the first original image data, and the two adjustment processes are independent of each other and are not affected by the other. This not only improves adjustment efficiency, but also obtains a target image with a better signal-to-noise ratio and better details, and eliminates blurring in the fused target image. In addition, after the visible light exposure parameter and the luminous intensity of the infrared illuminator are adjusted, only one original image including visible light and infrared light may be captured and fused to obtain a high-quality target image. This improves quality of the fused image while simplifying a fusion algorithm.

In a possible implementation, the adjusting the visible light exposure parameter based on a first difference includes: if an absolute value of the first difference falls outside of a preset first range, adjusting the visible light exposure parameter based on the first difference.

In this application, the visible light exposure parameter may be adjusted only when the luminance of the visible light image falls outside an allowable range of expected effect, to improve the adjustment efficiency.

In a possible implementation, before the adjusting the visible light exposure parameter based on a first difference, the method further includes: determining whether an exposure parameter allocation policy set includes an exposure parameter allocation policy corresponding to the first difference; and the adjusting the visible light exposure parameter based on a first difference includes: if the exposure parameter allocation policy set includes the exposure parameter allocation policy corresponding to the first difference, adjusting the visible light exposure parameter based on the exposure parameter allocation policy corresponding to the first difference; and if the exposure parameter allocation policy set does not include the exposure parameter allocation policy corresponding to the first difference, adding a new exposure parameter allocation policy, and adjusting the visible light exposure parameter based on the new exposure parameter allocation policy.

In a possible implementation, the visible light exposure parameter includes one or more of exposure time, an iris diameter, or an exposure gain; and the adjusting the visible light exposure parameter based on a first difference includes: when the luminance of the visible light image is lower than the target luminance of the visible light image, increasing the one or more of the exposure time, the iris diameter, or the exposure gain; or when the luminance of the visible light image is higher than the target luminance of the visible light image, decreasing the one or more of the exposure time, the iris diameter, or the exposure gain.

In this application, for a visible light image with high luminance, the one or more of the exposure time, the iris diameter, or the exposure gain of the visible light image may be decreased; and for a visible light image with low luminance, the one or more of the exposure time, the iris diameter, or the exposure gain of the visible light image may be increased. This improves the adjustment efficiency of the visible light exposure parameter, and ensures that adjustment of the visible light exposure parameter can meet an actual luminance requirement.

In a possible implementation, the adjusting the luminous intensity of the infrared illuminator based on a second difference includes: if an absolute value of the second difference falls outside of a preset second range, adjusting the luminous intensity of the infrared illuminator based on the second difference.

In this application, the luminous intensity of the infrared illuminator may be adjusted only when the luminance of the infrared image falls outside the allowable range of the expected effect, to improve the adjustment efficiency.

In a possible implementation, the adjusting the luminous intensity of the infrared illuminator based on a second difference includes: when the luminance of the infrared image is lower than the target luminance of the infrared image, increasing the luminous intensity of the infrared illuminator; or when the luminance of the infrared image is higher than the target luminance of the infrared image, decreasing the luminous intensity of the infrared illuminator.

In this application, for an infrared image with high luminance, the luminous intensity of the infrared illuminator may be decreased; and for an infrared image with low luminance, the luminous intensity of the infrared illuminator may be increased. This improves the adjustment efficiency of the luminous intensity of the infrared illuminator, and ensures that adjustment of the luminous intensity of the infrared illuminator can meet the actual luminance requirement.

In a possible implementation, the increasing the luminous intensity of the infrared illuminator includes: increasing the luminous intensity of the infrared illuminator by decreasing a duty cycle of pulse width modulation PWM of the infrared illuminator; and the decreasing the luminous intensity of the infrared illuminator includes: decreasing the luminous intensity of the infrared illuminator by increasing the duty cycle of the PWM of the infrared illuminator.

In a possible implementation, the adjusting the visible light exposure parameter based on a first difference includes: if an absolute value of the first difference between N consecutive frames of visible light images falls outside the first range, adjusting the visible light exposure parameter based on the first difference, where N is a positive integer.

In this application, the visible light exposure parameter may be adjusted only when the luminance of a plurality frames of visible light images falls outside the allowable range of the expected effect, to prevent a single frame from jumping.

In a possible implementation, the adjusting the visible light exposure parameter based on a first difference includes: when luminance of the N consecutive frames of visible light images is lower than the target luminance of the visible light image, increasing the one or more of the exposure time, the iris diameter, or the exposure gain; or when the luminance of the N consecutive frames of visible light images is higher than the target luminance of the visible light image, decreasing the one or more of the exposure time, the iris diameter, or the exposure gain.

In a possible implementation, the adjusting the luminous intensity of the infrared illuminator based on a second difference includes: if an absolute value of the second difference between M consecutive frames of infrared images falls outside the preset second range, adjusting the luminous intensity of the infrared illuminator based on the second difference, where M is a positive integer.

In this application, the luminous intensity of the infrared illuminator may be adjusted only when the luminance of a plurality frames of infrared images falls outside the allowable range of the expected effect, to prevent a single frame from jumping.

In a possible implementation, the adjusting the luminous intensity of the infrared illuminator based on a second difference includes: when the luminance of the M consecutive frames of infrared images is lower than the target luminance of the infrared image, increasing the luminous intensity of the infrared illuminator; or when the luminance of the M consecutive frames of infrared images is higher than the target luminance of the infrared image, decreasing the luminous intensity of the infrared illuminator.

In a possible implementation, the increasing the one or more of the exposure time, the iris diameter, or the exposure gain includes: in a static scenario, first increasing the exposure time, then increasing the exposure gain, and finally increasing the iris diameter; and in a motion scenario, first increasing the exposure gain, then increasing the exposure time, and finally increasing the iris diameter; and the decreasing the one or more of the exposure time, the iris diameter, or the exposure gain includes: in the static scenario, first decreasing the exposure time, then decreasing the exposure gain, and finally decreasing the iris diameter; and in the motion scenario, first decreasing the exposure gain, then decreasing the exposure time, and finally decreasing the iris diameter.

In this application, a corresponding parameter adjustment sequence may be specified for different scenarios, to decrease a number of parameter adjustments, and improve the adjustment efficiency.

In a possible implementation, an ultra-high-resolution RGBIR sensor is used to obtain a high-resolution visible light image and a high-resolution infrared image, and the two high-resolution images are fused to obtain the target image with a better signal-to-noise ratio and better details.

In a possible implementation, a high-resolution RGBIR sensor is used to obtain a low-resolution image, then a super-resolution algorithm is performed for the low-resolution image to obtain a high-resolution visible light image and a high-resolution infrared image, and the two high-resolution images are fused to obtain the target image with a better signal-to-noise ratio and better details.

According to a second aspect, this application provides an image obtaining apparatus. The image obtaining apparatus includes:

a first obtaining module, configured to obtain first original image data, where the first original image data is captured by using an image sensor based on an initial visible light exposure parameter and a luminous intensity of an infrared illuminator, and the first original image data includes visible light image data and infrared image data; a first processing module, configured to obtain a luminance of a visible light image based on the first original image data, and adjust the visible light exposure parameter based on a first difference, where the first difference is a difference between the luminance of the visible light image and a preset target luminance of the visible light image; a second processing module, configured to obtain a luminance of an infrared image based on the first original image data, and adjust the luminous intensity of the infrared illuminator based on a second difference, where the second difference is a difference between the luminance of the infrared image and a preset target luminance of the infrared image; a second obtaining module, configured to obtain second original image data, where the second original image data is captured by using the image sensor based on an adjusted visible light exposure parameter and an adjusted luminous intensity of the infrared illuminator; and a fusion module, configured to fuse, based on the visible light image data and the infrared image data in the second original image data, to obtain a target image.

In a possible implementation, the first processing module is specifically configured to: if an absolute value of the first difference falls outside of a preset first range, adjust the visible light exposure parameter based on the first difference.

In a possible implementation, the first processing module is specifically configured to: determine whether an exposure parameter allocation policy set includes an exposure parameter allocation policy corresponding to the first difference; if the exposure parameter allocation policy set includes the exposure parameter allocation policy corresponding to the first difference, adjust the visible light exposure parameter based on the exposure parameter allocation policy corresponding to the first difference; and if the exposure parameter allocation policy set does not include the exposure parameter allocation policy corresponding to the first difference, add a new exposure parameter allocation policy, and adjust the visible light exposure parameter based on the new exposure parameter allocation policy.

In a possible implementation, the visible light exposure parameter includes one or more of exposure time, an iris diameter, or an exposure gain; and the first processing module is specifically configured to: when the luminance of the visible light image is lower than the target luminance of the visible light image, increase the one or more of the exposure time, the iris diameter, or the exposure gain; or when the luminance of the visible light image is higher than the target luminance of the visible light image, decrease the one or more of the exposure time, the iris diameter, or the exposure gain.

In a possible implementation, the second processing module is specifically configured to: if an absolute value of the second difference falls outside of a preset second range, adjust the luminous intensity of the infrared illuminator based on the second difference.

In a possible implementation, the second processing module is specifically configured to: when the luminance of the infrared image is lower than the target luminance of the infrared image, increase the luminous intensity of the infrared illuminator; or when the luminance of the infrared image is higher than the target luminance of the infrared image, decrease the luminous intensity of the infrared illuminator.

In a possible implementation, the second processing module is specifically configured to: increase the luminous intensity of the infrared illuminator by decreasing a duty cycle of pulse width modulation PWM of the infrared illuminator; or decrease the luminous intensity of the infrared illuminator by increasing the duty cycle of the PWM of the infrared illuminator.

In a possible implementation, the first processing module is specifically configured to: if an absolute value of the first difference between N consecutive frames of visible light images falls outside the first range, adjust the visible light exposure parameter based on the first difference, where N is a positive integer.

In a possible implementation, the first processing module is specifically configured to: when the luminance of the N consecutive frames of visible light images is lower than the target luminance of the visible light image, increase the one or more of the exposure time, the iris diameter, or the exposure gain; or when the luminance of the N consecutive frames of visible light images is higher than the target luminance of the visible light image, decrease the one or more of the exposure time, the iris diameter, or the exposure gain.

In a possible implementation, the second processing module is specifically configured to: if an absolute value of the second difference between M consecutive frames of infrared images falls outside the preset second range, adjust the luminous intensity of the infrared illuminator based on the second difference, where M is a positive integer.

In a possible implementation, the second processing module is specifically configured to: when the luminance of the M consecutive frames of infrared images is lower than the target luminance of the infrared image, increase the luminous intensity of the infrared illuminator; or when luminance of the M consecutive frames of infrared images is higher than the target luminance of the infrared image, decrease the luminous intensity of the infrared illuminator.

In a possible implementation, the first processing module is specifically configured to: in a static scenario, first increase the exposure time, then increase the exposure gain, and finally increase the iris diameter; in a motion scenario, first increase the exposure gain, then increase the exposure time, and finally increase the iris diameter; in the static scenario, first decrease the exposure time, then decrease the exposure gain, and finally decrease the iris diameter; and in the motion scenario, first decrease the exposure gain, then decrease the exposure time, and finally decrease the iris diameter.

According to a third aspect, this application provides an image obtaining apparatus. The image obtaining apparatus includes: one or more processors, configured to invoke program instructions stored in a memory, to perform the following steps: obtaining first original image data by using an image sensor, where the first original image data is captured by using an image sensor based on an initial visible light exposure parameter and luminous intensity of an infrared illuminator, and the first original image data includes visible light image data and infrared image data; obtaining a luminance of a visible light image based on the first original image data; adjusting the visible light exposure parameter based on a first difference, where the first difference is a difference between the luminance of the visible light image and a preset target luminance of the visible light image; obtaining a luminance of an infrared image based on the first original image data; adjusting the luminous intensity of the infrared illuminator based on a second difference, where the second difference is a difference between the luminance of the infrared image and a preset target luminance of the infrared image; obtaining second original image data by using the image sensor, where the second original image data is captured by using the image sensor based on an adjusted visible light exposure parameter and an adjusted luminous intensity of the infrared illuminator; and fusing, based on the visible light image data and the infrared image data in the second original image data, to obtain a target image.

In a possible implementation, the processor is specifically configured to: if an absolute value of the first difference falls outside of a preset first range, adjust the visible light exposure parameter based on the first difference.

In a possible implementation, the processor is specifically configured to: determine whether an exposure parameter allocation policy set includes an exposure parameter allocation policy corresponding to the first difference; if the exposure parameter allocation policy set includes the exposure parameter allocation policy corresponding to the first difference, adjust the visible light exposure parameter based on the exposure parameter allocation policy corresponding to the first difference; and if the exposure parameter allocation policy set does not include the exposure parameter allocation policy corresponding to the first difference, add a new exposure parameter allocation policy, and adjust the visible light exposure parameter based on the new exposure parameter allocation policy.

In a possible implementation, the visible light exposure parameter includes one or more of exposure time, an iris diameter, or an exposure gain; and the processor is specifically configured to: when the luminance of the visible light image is lower than the target luminance of the visible light image, increase the one or more of the exposure time, the iris diameter, or the exposure gain; or when the luminance of the visible light image is higher than the target luminance of the visible light image, decrease the one or more of the exposure time, the iris diameter, or the exposure gain.

In a possible implementation, the processor is specifically configured to: if an absolute value of the second difference falls outside of a preset second range, adjust the luminous intensity of the infrared illuminator based on the second difference.

In a possible implementation, the processor is specifically configured to: when the luminance of the infrared image is lower than the target luminance of the infrared image, increase the luminous intensity of the infrared illuminator; or when the luminance of the infrared image is higher than the target luminance of the infrared image, decrease the luminous intensity of the infrared illuminator.

In a possible implementation, the processor is specifically configured to: increase the luminous intensity of the infrared illuminator by decreasing a duty cycle of pulse width modulation PWM of the infrared illuminator; or decrease the luminous intensity of the infrared illuminator by increasing the duty cycle of the PWM of the infrared illuminator.

In a possible implementation, the processor is specifically configured to: if an absolute value of the first difference between N consecutive frames of visible light images falls outside the first range, adjust the visible light exposure parameter based on the first difference, where N is a positive integer.

In a possible implementation, the processor is specifically configured to: when the luminance of the N consecutive frames of visible light images is lower than the target luminance of the visible light image, increase the one or more of the exposure time, the iris diameter, or the exposure gain; or when the luminance of the N consecutive frames of visible light images is higher than the target luminance of the visible light image, decrease the one or more of the exposure time, the iris diameter, or the exposure gain.

In a possible implementation, the processor is specifically configured to: if an absolute value of the second difference between M consecutive frames of infrared images falls outside the preset second range, adjust the luminous intensity of the infrared illuminator based on the second difference, where M is a positive integer.

In a possible implementation, the processor is specifically configured to: when the luminance of the M consecutive frames of infrared images is lower than the target luminance of the infrared image, increasing the luminous intensity of the infrared illuminator; or when the luminance of the M consecutive frames of infrared images is higher than the target luminance of the infrared image, decrease the luminous intensity of the infrared illuminator.

In a possible implementation, the processor is specifically configured to: in a static scenario, first increase the exposure time, then increase the exposure gain, and finally increase the iris diameter; in a motion scenario, first increase the exposure gain, then increase the exposure time, and finally increase the iris diameter; in the static scenario, first decrease the exposure time, then decrease the exposure gain, and finally decrease the iris diameter; and in the motion scenario, first decrease the exposure gain, then decrease the exposure time, and finally decrease the iris diameter.

According to a fourth aspect, this application provides a terminal device. The terminal device includes: an image sensor, configured to capture first original image data based on an initial visible light exposure parameter and luminous intensity of an infrared illuminator, where the first original image data includes visible light image data and infrared image data; and a processor, configured to invoke software instructions stored in a memory, to perform the following steps: obtaining a luminance of a visible light image based on the first original image data; adjusting the visible light exposure parameter based on a first difference, where the first difference is a difference between the luminance of the visible light image and a preset target luminance of the visible light image; obtaining a luminance of an infrared image based on the first original image data; and adjusting the luminous intensity of the infrared illuminator based on a second difference, where the second difference is a difference between the luminance of the infrared image and a preset target luminance of the infrared image. The image sensor is further configured to capture second original image data based on an adjusted visible light exposure parameter and an adjusted luminous intensity of the infrared illuminator. The processor is further configured to fuse, based on the visible light image data and the infrared image data in the second original image data, to obtain a target image.

In a possible implementation, the processor is further configured to perform the method in any one of the implementations except the first possible implementation of the first aspect.

According to a fifth aspect, this application provides a computer-readable storage medium. The computer-readable storage medium includes a computer program. When the computer program is executed on a computer or a processor, the computer or the processor is enabled to perform the method according to any one of the possible implementations of the first aspect.

According to a sixth aspect, this application provides a computer program product. When the computer program product is executed on a computer or a processor, the computer program product is enabled to perform the method according to any one of the possible implementations of the first aspect.

According to a seventh aspect, this application provides a chip. The chip includes a processor and a memory. The memory is configured to store a computer program, and the processor is configured to invoke and run the computer program stored in the memory, to perform the method according to any one of the possible implementations of the first aspect.

BRIEF DESCRIPTION OF DRAWINGS

FIG. 2a and FIG. 2b are two examples of light sensitivity results of RGBIR sensors arranged in a 2×2 array;

FIG. 3a and FIG. 3b are two examples of light sensitivity results of RGBIR sensors arranged in a 4×4 array;

DESCRIPTION OF EMBODIMENTS

To make the objectives, technical solutions, and advantages of this application clearer, the following clearly and completely describes the technical solutions in this application with reference to the accompanying drawings in this application. Obviously, the described embodiments are a part rather than all of embodiments of this application. All other embodiments obtained by a person of ordinary skill in the art based on embodiments of this application without creative efforts shall fall within the protection scope of this application.

In the specification, embodiments, claims, and accompanying drawings of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, include a series of steps or units. Methods, systems, products, or devices do not need to be limited to those steps or units that are clearly listed, but may include other steps or units that are not clearly listed or inherent to these processes, methods, products, or devices.

It should be understood that in this application, "at least one (item)" refers to one or more and "a plurality of" refers to two or more. The term "and/or" is used to describe an association relationship between associated objects, and indicates that three relationships may exist. For example, "A and/or B" may indicate the following three cases: Only A exists, only B exists, and both A and B exist, where A and B may be singular or plural. The character "/" generally indicates an "or" relationship between the associated objects. "At least one of the following items (pieces)" or a similar expression thereof means any combination of these items, including a single item (piece) or any combination of a plurality of items (pieces). For example, at least one of a, b, and c may indicate a, b, c, "a and b", "a and c", "b and c", or "a, b, and c", where a, b, and c may be singular or plural.

A terminal device in this application may also be referred to as user equipment (UE), and may be deployed on land, including an indoor or outdoor scenario and a handheld or in-vehicle scenario, or may be deployed on water (for example, on a steamship), or may be deployed in the air (for example, on an airplane, a balloon, or a satellite). The terminal device may be a terminal device 100 (mobile phone), a tablet computer (pad), a computer with a wireless transceiver function, a virtual reality (VR) device, an augmented reality (AR) device, a monitoring device, a smart large screen, a smart television, a wireless device in remote medical, a wireless device in smart home, or the like. This is not limited in this application.

Figure 1:
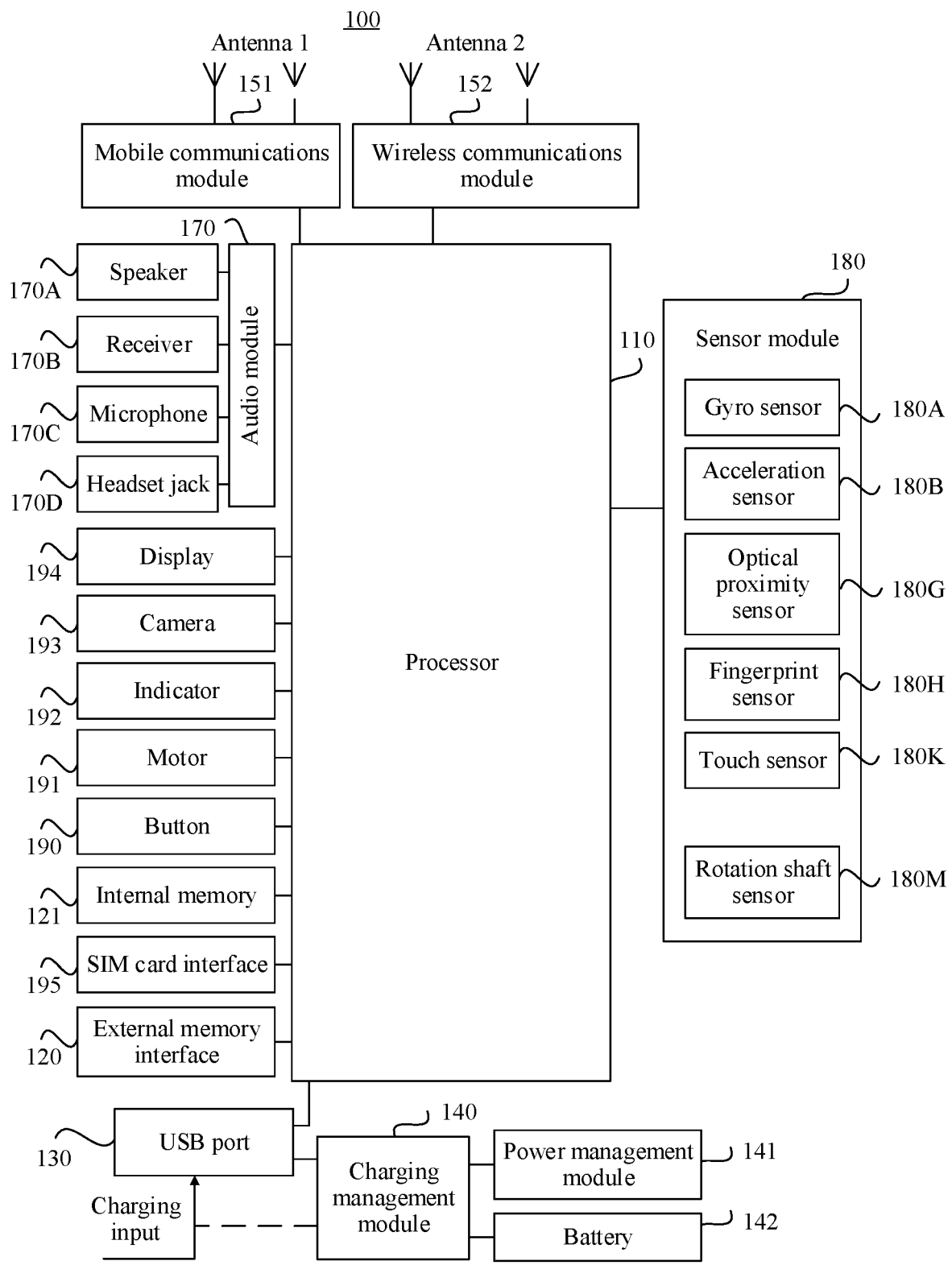
FIG. 1 is an example of a schematic diagram of a structure of a terminal device 100.

FIG. 1 is an example of a schematic diagram of a structure of a terminal device 100. The terminal device 100 may include a processor 110, an external memory interface 120, an internal memory 121, a USB port 130, a charging management module 140, a power management module 141, a battery 142, an antenna 1, an antenna 2, a mobile communications module 151, a wireless communications module 152, an audio module 170, a speaker 170A, a receiver 170B, a microphone 170C, a headset jack 170D, a sensor module 180, a key 190, a motor 191, an indicator 192, a camera 193, a display 194, a SIM card interface 195, and the like. The sensor module 180 may include a gyro sensor 180A, an acceleration sensor 180B, an optical proximity sensor 180G, a fingerprint sensor 180H, a touch sensor 180K, and a rotating shaft sensor 180M (certainly, the terminal device 100 may further include another sensor, for example, a temperature sensor, a pressure sensor, a distance sensor, a magnetic sensor, an ambient light sensor, a barometric pressure sensor, or a bone conduction sensor, which is not shown in the figure).

It can be understood that, a structure illustrated in this embodiment of this application does not constitute a specific limitation on the terminal device 100. In some other embodiments of this application, the terminal device 100 may include more or fewer parts than those shown in the figure, or combine some parts, or split some parts, or have different component arrangements. The components shown in the figure may be implemented by hardware, software, or a combination of software and hardware.

The processor 110 may include one or more processing units. For example, the processor 110 may include an application processor (AP), a modem processor, a graphics processing unit (GPU), an image signal processor (ISP), a controller, a memory, a video codec, a digital signal processor (DSP), a baseband processor, and/or a neural-network processing unit (NPU). Different processing units may be independent devices, or may be integrated into one or more processors. The controller may be a nerve center and a command center of the terminal device 100. The controller may generate an operation control signal based on an instruction operation code and a time sequence signal, to control instruction fetching and instruction execution.

A memory may be further disposed in the processor 110, and is configured to store instructions and data. In some embodiments, the memory in the processor 110 is a cache. The memory may store instructions or data that has been used or is cyclically used by the processor 110. If the processor 110 needs to use the instructions or the data again, the processor may directly invoke the instructions or the data from the memory. This avoids repeated access and reduces waiting time of the processor 110, thereby improving system efficiency.

When different devices are integrated into the processor 110, for example, a CPU and a GPU are integrated, the CPU and the GPU may cooperate to perform a method provided in the embodiments of this application. For example, in the method, some algorithms are performed by the CPU, and the other algorithms are performed by the GPU, to achieve relatively high processing efficiency.

The display 194 is configured to display an image, a video, or the like. The display 194 includes a display panel. The display panel may be a liquid crystal display (LCD), an organic light-emitting diode (OLED), an active-matrix organic light emitting diode (AMOLED), a flexible light-emitting diode (FLED), a Miniled, a MicroLed, a Micro-oLed, a quantum dot light emitting diode (QLED), or the like. In some embodiments, the terminal device 100 may include one or N displays 194, where N is a positive integer greater than 1.

The camera 193 (a front-facing camera, a rear-facing camera, or a camera that may serve as both a front-facing camera and a rear-facing camera) is configured to capture a static image or a video. Generally, the camera 193 may include a photosensitive element such as a lens module and an image sensor. The lens module includes a plurality of optical lenses (concave lenses or convex lenses), configured to capture an optical signal reflected by a to-be-photographed object and transmit the captured optical signal to the image sensor. The image sensor generates an original image of the to-be-photographed object based on the optical signal. The image sensor used in this application may be a new RGBIR sensor. In addition, the camera 193 may further include an image signal processing (ISP) module, an infrared lamp drive control module, an infrared illuminator, and the like. A traditional RGB sensor can receive only light in red, green, and blue bands. The RGBIR sensor can receive light in red, green, blue, and infrared bands. In a low illumination scenario, if the luminous intensity in the red, green, and blue bands is weak, the quality of an image obtained by using the RGB sensor is poor. The RGBIR sensor in the low illumination scenario can obtain not only the light in the red, green, and blue bands, but also the light in the infrared band. The light in the infrared band may provide better luminance information, and the light in the red, green, and blue bands may provide a small amount of luminance information and color information. In this way, the quality of the image obtained by using the RGBIR sensor is better.

The internal memory 121 may be configured to store computer-executable program code. The executable program code includes instructions. The processor 110 runs the instructions stored in the internal memory 121, to perform various function applications and signal processing of the terminal device 100. The internal memory 121 may include a program storage area and a data storage area. The program storage area may store code of an operating system, an application (for example, a camera application or WeChat), and the like. The data storage area may store data (for example, an image or a video captured by the camera application) created during use of the terminal device 100 and the like.

In addition, the internal memory 121 may include a high-speed random access memory, or may include a non-volatile memory, for example, at least one magnetic disk storage device, a flash memory, or a universal flash storage (UFS).

Certainly, code of the method provided in the embodiments of this application may alternatively be stored in an external memory. In this case, the processor 110 may run, through the external memory interface 120, the code stored in the external memory.

The following describes functions of the sensor module 180.

The gyro sensor 180A may be configured to determine a motion posture of the terminal device 100. In some embodiments, angular velocities of the terminal device 100 around three axes (namely, x, y, and z axes) may be determined by using the gyroscope sensor 180A. In other words, the gyro sensor 180A may be configured to detect a current motion state of the terminal device 100, for example, a shaken or static state.

The acceleration sensor 180B may detect magnitudes of accelerations of the terminal device 100 in various directions (generally on three axes). In other words, the gyro sensor 180A may be configured to detect a current motion state of the terminal device 100, for example, a shaken or static state.

The optical proximity sensor 380G may include, for example, a light emitting diode (LED) and a light detector such as a photodiode. The light-emitting diode may be an infrared light-emitting diode. The terminal device 100 emits infrared light outward by using the light-emitting diode. The terminal device 100 detects infrared reflected light from a nearby object by using the photodiode. When detecting plenty of reflected light, the terminal device 100 may determine that there is an object near the terminal device 100. When detecting inadequate reflected light, the terminal device 100 may determine that there is no object near the terminal device 100.

The gyro sensor 180A (or the acceleration sensor 180B) may send detected motion status information (for example, an angular velocity) to the processor 110. The processor 110 determines, based on the motion status information, whether the terminal device is currently in a handheld state or a tripod state (for example, when the angular velocity is not 0, it indicates that the terminal device 100 is in the handheld state).

The fingerprint sensor 180H is configured to capture a fingerprint. The terminal device 100 may use a feature of the captured fingerprint to implement fingerprint-based unlocking, application lock access, fingerprint-based photographing, fingerprint-based call answering, and the like.

The touch sensor 180K is also referred to as a "touch panel". The touch sensor 180K may be disposed on the display 194, and the touch sensor 180K and the display 194 form a touchscreen, which is also referred to as a "touch screen". The touch sensor 180K is configured to detect a touch operation on or near the touch sensor 180K. The touch sensor may transfer the detected touch operation to the application processor, to determine a type of a touch event. A visual output related to the touch operation may be provided on the display 194. In some other embodiments, the touch sensor 180K may alternatively be disposed on a surface of the terminal device 100, and at a location different from that of the display 194.

For example, the display 194 of the terminal device 100 displays a home screen, and the home screen includes icons of a plurality of applications (for example, a camera application and WeChat). The user taps the icon of the camera application on the home screen by using the touch sensor 180K, to trigger the processor 110 to open the camera application and turn on the camera 193. The display 194 displays an interface of the camera application, for example, a viewfinder interface.

A wireless communication function of the terminal device 100 may be implemented by using the antenna 1, the antenna 2, the mobile communications module 151, the wireless communications module 152, the modem processor, the baseband processor, and the like.

The antenna 1 and the antenna 2 are configured to transmit and receive electromagnetic wave signals. Each antenna in the terminal device 100 may be configured to cover one or more communications frequency bands. Different antennas may be further multiplexed, to increase antenna utilization.

For example, the antenna 1 may be multiplexed as a diversity antenna of a wireless local area network. In some other embodiments, the antenna may be used in combination with a tuning switch.

The mobile communications module 151 can provide a solution, applied to the terminal device 100, for wireless communication including 2G/3G/4G/5G and the like. The mobile communications module 151 may include at least one filter, a switch, a power amplifier, a low noise amplifier (LNA), and the like. The mobile communications module 151 may receive an electromagnetic wave through the antenna 1, perform processing such as filtering or amplification on the received electromagnetic wave, and transfer the electromagnetic wave to the modem processor for demodulation. The mobile communications module 151 may further amplify a signal modulated by the modem processor, and convert the signal into an electromagnetic wave for radiation through the antenna 1. In some embodiments, at least some function modules of the mobile communications module 151 may be disposed in the processor 110. In some embodiments, at least some function modules of the mobile communications module 151 and at least some modules of the processor 110 may be disposed in a same device.

The modem processor may include a modulator and a demodulator. The modulator is configured to modulate a to-be-sent low-frequency baseband signal into a medium/high-frequency signal. The demodulator is configured to demodulate a received electromagnetic wave signal into a low-frequency baseband signal. Then the demodulator transmits the low-frequency baseband signal obtained through demodulation to the baseband processor for processing. After being processed by the baseband processor, the low-frequency baseband signal is transmitted to the application processor. The application processor outputs a sound signal by using an audio device (which is not limited to the speaker 170A, the receiver 170B, or the like), or displays an image or a video on the display 194. In some embodiments, the modem processor may be an independent device. In some other embodiments, the modem processor may be independent of the processor 110, and is disposed in a same device as the mobile communications module 151 or another function module.

The wireless communications module 152 may provide a solution, applied to the terminal device 100, to wireless communication including a wireless local area network (WLAN) (for example, a wireless fidelity (Wi-Fi) network), Bluetooth (BT), a global navigation satellite system (GNSS), frequency modulation (FM), near field communication (NFC), an infrared (IR) technology, and the like. The wireless communications module 152 may be one or more devices integrating at least one communications processing module. The wireless communications module 152 receives an electromagnetic wave through the antenna 2, performs frequency modulation and filtering processing on an electromagnetic wave signal, and sends a processed signal to the processor 110. The wireless communications module 152 may further receive a to-be-sent signal from the processor 110, perform frequency modulation and amplification on the signal, and convert the signal into an electromagnetic wave for radiation through the antenna 2.

In some embodiments, the antenna 1 of the terminal device 100 is coupled to the mobile communications module 151, and the antenna 2 thereof is coupled to the wireless communications module 152, so that the terminal device 100 can communicate with a network and another device by using a wireless communications technology. The wireless communication technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, a GNSS, a WLAN, NFC, FM, an IR technology, and/or the like. The GNSS may include a global positioning system (GPS), a global navigation satellite system (GLONASS), a Beidou navigation satellite system (BDS), a quasi-zenith satellite system (QZSS), and/or a satellite based augmentation system (SBAS).

The terminal device 100 may implement an audio function by using the audio module 170, the speaker 170A, the receiver 170B, the microphone 170C, the headset jack 170D, the application processor, and the like, for example, implement a music playback function and a recording function. The terminal device 100 may receive an input of the key 190, and generate a key signal input related to user setting and function control of the terminal device 100. The terminal device 100 may generate a vibration prompt (for example, an incoming call vibration prompt) by using the motor 191. The indicator 192 in the terminal device 100 may be an indicator light, and may be configured to indicate a charging status and a power change, and may further be configured to indicate a message, a missed call, a notification, and the like. The SIM card interface 195 in the terminal device 100 is configured to connect to a SIM card. The SIM card may be inserted into the SIM card interface 195 or removed from the SIM card interface 195, to implement contact with or separation from the terminal device 100.

It should be understood that, in actual application, the terminal device 100 may include more or fewer parts than those shown in FIG. 1. This is not limited in the embodiments of this application.

The new RGBIR sensor provided in this application may independently sense visible light and infrared (IR) light, and obtains an IR signal from a light sensitivity result of a visible light signal, to improve color accuracy of the light sensitivity result of the sensor.

FIG. 2a and FIG. 2b are two examples of light sensitivity results of RGBIR sensors arranged in a 2×2 array. FIG. 3a and FIG. 3b are two examples of light sensitivity results of RGBIR sensors arranged in a 4×4 array. In the figure, each grid represents one pixel, R indicates a red pixel, G indicates a green pixel, B indicates a blue pixel, and IR indicates an infrared pixel. The 2×2 array arrangement indicates that a minimum repetition unit of arrangement of the four RGBIR components is a 2×2 array, and the 2×2 array unit includes all components of R, G, B, and IR. The 4×4 array arrangement indicates that a minimum repetition unit of arrangement of the four RGBIR components is a 4×4 array, and the 4×4 array unit includes all components. It should be understood that the RGBIR sensor in the 2×2 array or the 4×4 array may be arranged in another manner. An arrangement manner of the RGBIR sensor is not limited in this embodiment of this application.

Figure 4:
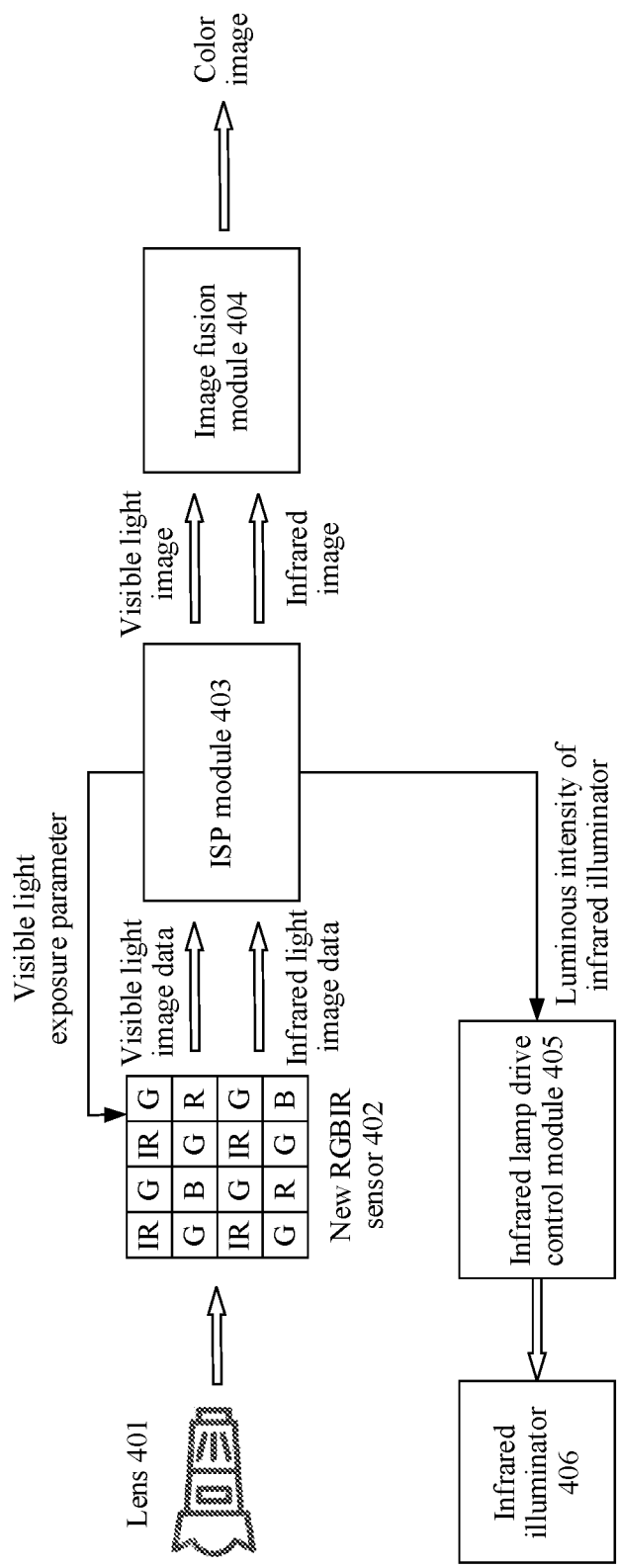
FIG. 4 is an example of a schematic diagram of a structure of an image obtaining apparatus.

FIG. 4 is an example of a schematic diagram of a structure of an image obtaining apparatus. As shown in FIG. 4, the image obtaining apparatus includes modules such as a lens 401, a new RGBIR sensor 402, an image signal processor (ISP) 403, an image fusion module 404, an infrared light drive control module 405, and an infrared illuminator 406. The lens 401 is configured to capture a still image or a video, capture an optical signal reflected from a to-be-photographed object, and transfer the captured optical signal to the image sensor. The new RGBIR sensor 402 generates original image data (visible light image data and infrared image data)

of the to-be-photographed object based on the optical signal. The ISP module 403 is configured to adjust a visible light exposure parameter and luminous intensity of the infrared illuminator based on an original image of the to-be-photographed object until a convergence condition of an AE algorithm is met, and is further configured to separate a visible light image and an infrared image from the original image of the to-be-photographed object. The image fusion module 404 is configured to fuse the separated visible light image and the infrared image to obtain a target image. The infrared light drive control module 405 is configured to control the infrared illuminator 406 based on the luminous intensity of the infrared illuminator configured by the ISP module 403. The infrared illuminator 406 is configured to provide infrared light illumination.

Optionally, the image obtaining apparatus may use a structure of a single lens plus a single RGBIR sensor, or a dual lens plus dual RGBIR sensors, or a single lens plus a splitter and dual RGBIR sensors. The structure of the single lens can reduce costs, and the structure of the single RGBIR sensor can simplify the structure of a camera. This is not specifically limited in this application.

Figure 5:
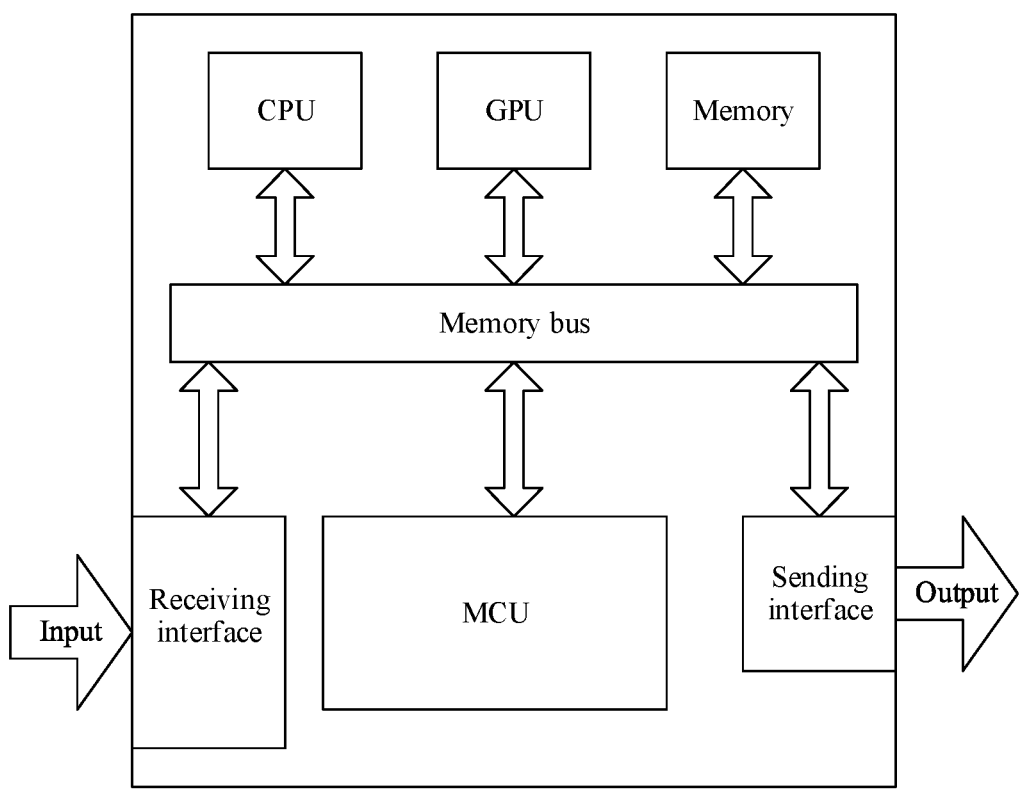
FIG. 5 is a schematic diagram of a hardware architecture of an independent exposure apparatus.

In the image obtaining apparatus shown in FIG. 4, an independent exposure apparatus may be used in this application, to implement functions of the new RGBIR sensor 402. FIG. 5 is a schematic diagram of a hardware architecture of an independent exposure apparatus. The exposure control apparatus includes: at least one central processing unit (CPU), at least one memory, a microcontroller unit (MCU), a receiving interface, a sending interface, and the like. Optionally, the exposure control apparatus 1600 further includes a dedicated video or graphics processor, a graphics processing unit (GPU), and the like.

Optionally, the CPU may be a single-core processor (single-CPU) or a multi-core processor (multi-CPU). Optionally, the CPU may be a processor group including a plurality of processors, and the plurality of processors are coupled to each other by using one or more buses. In an optional case, exposure control may be partially implemented by software code that is run on a general-purpose CPU or an MCU and partially implemented by a hardware logic circuit, or may be entirely implemented by software code that is run on a general-purpose CPU or an MCU. Optionally, the memory 302 may be a nonvolatile memory, for example, an embedded multimedia card (EMMC), a universal flash storage (UFS), or a read-only memory (ROM); or may be another type of static storage device that can store static information and an instruction; or may be a volatile memory, for example, a random access memory (RAM), or another type of dynamic storage device that can store information and an instruction; or may be an electrically erasable programmable read-only memory (EPROM), a compact disc read-only memory (CD-ROM) or another optical disc storage, an optical disc storage (including a compressed optical disc, a laser disc, an optical disc, a digital versatile disc, a Blu-ray disc, or the like), a magnetic disk storage medium or another magnetic storage device, or any other computer-readable storage medium that can be configured to carry or store program code in a form of an instruction or a data structure and can be accessed by a computer. However, the memory is not limited thereto. The receiving interface may be a data input interface of a processor chip.

In a possible implementation, the independent exposure apparatus further includes a pixel array. In this case, the independent exposure apparatus includes at least two types of pixels, that is, the independent exposure apparatus may be a sensor including a control unit or a logic control circuit, or the independent exposure apparatus is a sensor that can independently control exposure. For example, the independent exposure apparatus may be an RGBIR sensor, an RGBW sensor, an RCCB sensor, or the like that independently controls exposure.

It should be understood that in an optional case, a visible light pixel is classified into one type of pixel, to be specific, an R pixel, a G pixel, and a B pixel are classified into one type of pixel, and an IR pixel, a W pixel, or a C pixel is considered as another type of pixel. For example, the RGBIR sensor includes two types of pixels: the visible light pixel and the IR pixel. The RGBW sensor includes two types of pixels: the visible light pixel and the W pixel. The RCCB sensor includes two types of pixels: the visible light pixel and the C pixel.

In another optional case, each pixel component is considered as one type of pixel. For example, the RGBIR sensor includes: four types of pixels: R, G, B, and IR, the RGBW sensor includes four types of pixels: R, G, B, and W, and the RCCB sensor includes three types of pixels: R, B, and C.

In a possible implementation, the sensor is an RGBIR sensor, and the RGBIR sensor may implement independent exposure of the visible light pixel and the IR pixel, or may implement independent exposure of the four components R, G, B, and IR.

For the RGBIR sensor that independently exposes the visible light pixel and the IR pixel, the at least two control units include a first control unit and a second control unit. The first control unit is configured to control an exposure start time point of the visible light pixel. The second control unit is configured to control an exposure start time point of the IR pixel.

For the RGBIR sensor that independently exposes the four components R, G, B, and IR, the at least two control units include a first control unit, a second control unit, a third control unit, and a fourth control unit. The first control unit is configured to control an exposure start time point of the R pixel. The second control unit is configured to control an exposure start time point of the G pixel. The third control unit is configured to control an exposure start time point of the B pixel. The fourth control unit is configured to control an exposure start time point of the IR pixel.

In a possible implementation, the sensor is an RGBW sensor, and the RGBW sensor may implement independent exposure of the visible light pixel and the W pixel, or may implement independent exposure of the four components R, G, B, and W.

For the RGBW sensor that independently exposes the visible light pixel and W pixel, the at least two control units include a first control unit and a second control unit. The first control unit is configured to control an exposure start time point of the visible light pixel. The second control unit is configured to control an exposure start time point of the W pixel.

For the RGBW sensor that independently exposes the four components R, G, B, and W, the at least two control units include a first control unit, a second control unit, a third control unit, and a fourth control unit. The first control unit is configured to control an exposure start time point of the R pixel. The second control unit is configured to control an exposure start time point of the G pixel. The third control unit is configured to control an exposure start time point of the B pixel. The fourth control unit is configured to control an exposure start time point of the W pixel.

In a possible implementation, the sensor is an RCCB sensor, and the RCCB sensor may implement independent exposure of the visible light pixel and the C pixel, or may implement independent exposure of the three components R, B, and C.

For the RGBW sensor that independently exposes the visible light pixel and C pixel, the at least two control units include a first control unit and a second control unit. The first control unit is configured to control an exposure start time point of the visible light pixel. The second control unit is configured to control an exposure start time point of the C pixel.

For the RCCB sensor that independently exposes the three components R, B, and C, the at least two control units include a first control unit, a second control unit, and a third control unit. The first control unit is configured to control an exposure start time point of the R pixel. The second control unit is configured to control an exposure start time point of the B pixel. The third control unit is configured to control an exposure start time point of the C pixel.

In a possible implementation, the independent exposure apparatus may further control exposure durations of the at least two types of pixels based on the at least two control units, to meet a preset ratio. For example, exposure durations of the visible light pixel and the IR pixel are controlled based on the first control unit and the second control unit, to meet a preset ratio. Alternatively, exposure durations of the R, G, B, and IR pixels are controlled based on the first control unit, the second control unit, the third control unit, and the fourth control unit, to meet a preset ratio. Alternatively, exposure durations of the visible light pixel and the W pixel are controlled based on the first control unit and the second control unit, to meet a preset ratio. Alternatively, exposure durations of the R, G, B, and W pixels are controlled based on the first control unit, the second control unit, the third control unit, and the fourth control unit, to meet a preset ratio. Alternatively, exposure durations of the visible light pixel and the C pixel are controlled based on the first control unit and the second control unit, to meet a preset ratio. Alternatively, exposure durations of the R pixel, the B pixel, and the C pixel are controlled based on the first control unit, the second control unit, and the third control unit, to meet a preset ratio.

In a possible implementation, the independent exposure apparatus further includes an exposure end control unit, configured to uniformly control exposure end time points of all pixels in the pixel array.

Figure 6:
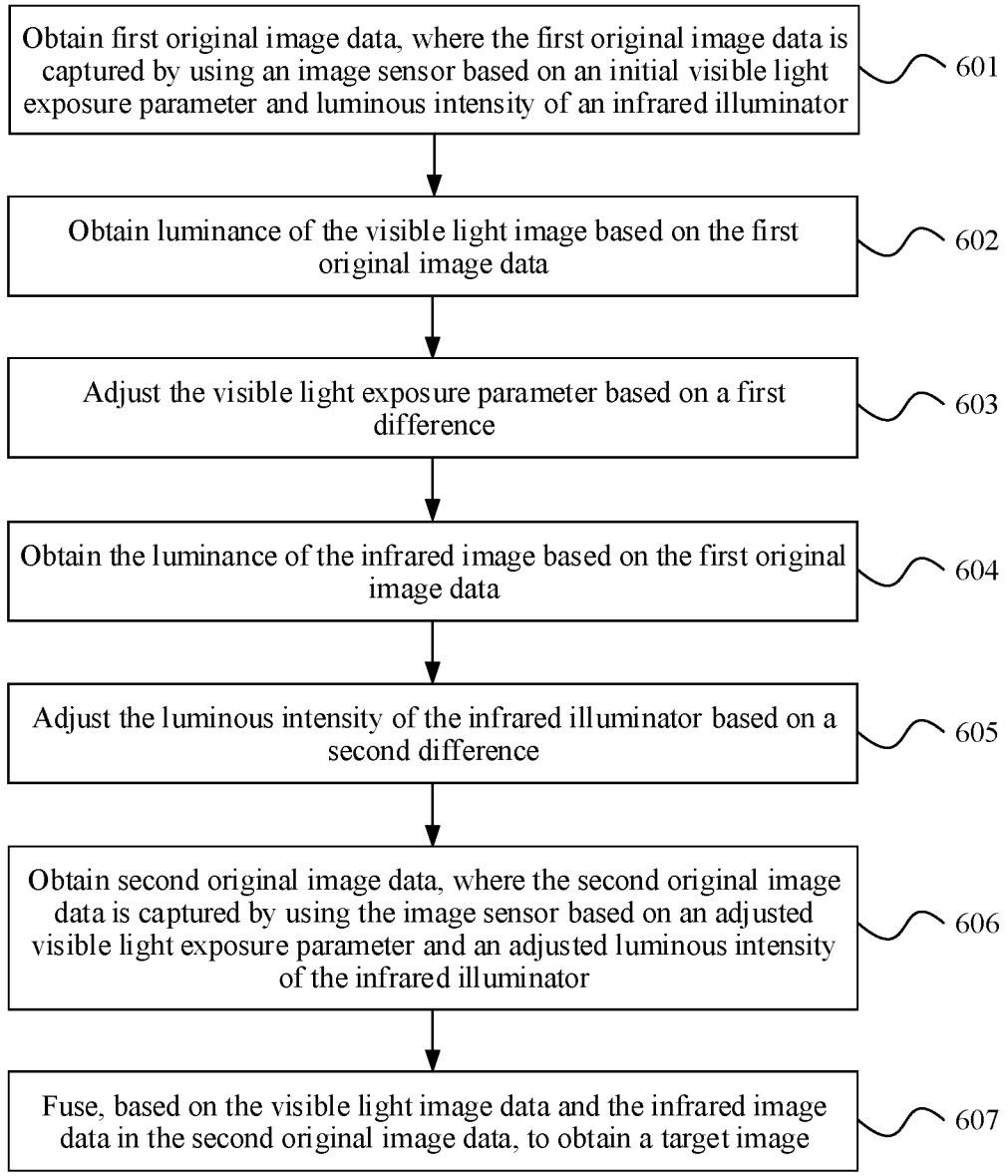
FIG. 6 is a flowchart of an example of an embodiment of an image fusion method according to an embodiment of this application.

FIG. 6 is a flowchart of an example of an embodiment of an image fusion method according to an embodiment of this application. As shown in FIG. 6, the method in this embodiment may be performed by the terminal device, the image obtaining apparatus, or the processor. The image fusion method may include the following steps.

Step 601: Obtain first original image data, where the first original image data is captured by using an image sensor based on an initial visible light exposure parameter and luminous intensity of an infrared illuminator.

Figures 7, 8:
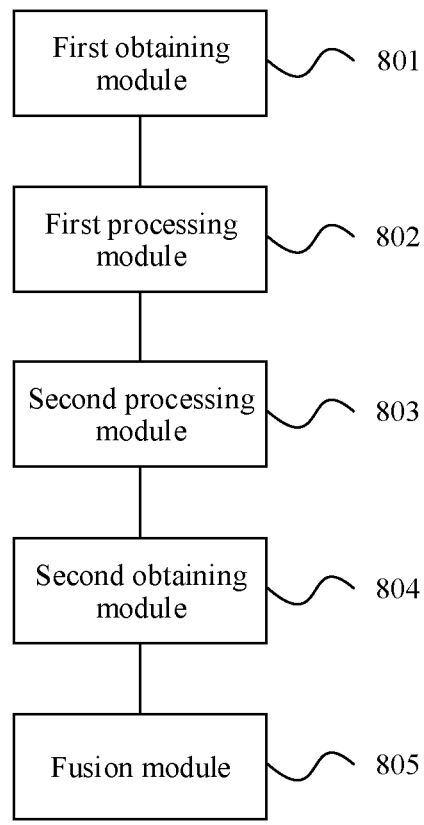
FIG. 7 is an example of a light sensitivity result of a traditional RGBIR sensor.
FIG. 8 is an example of a schematic diagram of a structure of an image obtaining apparatus according to an embodiment of this application.

The first original image data includes visible light image data and infrared image data. An exposure algorithm of a traditional sensor can be used to configure a parameter only in a visible light scenario or an infrared scenario. Therefore, the captured original image data is three-dimensional RGB information or one-dimensional IR information. An exposure algorithm of a common RGBIR sensor can be used to configure the visible light exposure parameter in the visible light scenario and configure the luminous intensity of the infrared illuminator in the infrared scenario. Therefore, the captured original image data includes four-dimensional RGBIR information, to be specific, a three-dimensional RGB component (the visible light image data) and a one-dimensional IR component (the infrared image data). However, as shown in FIG. 7, each pixel includes the IR component, and a portion of pixels include an R component and the IR component, a G component and the IR component, or a B component and the IR component. Therefore, two components cannot be fully separated. However, a new RGBIR sensor (described in the embodiments shown in FIG. 4 and FIG. 5) is used in this application. The exposure algorithm of the RGBIR sensor may configure the visible light exposure parameter in the visible light scenario, and may also configure the luminous intensity of the infrared illuminator in the infrared scenario. Therefore, the captured original image data includes the four-dimensional RGBIR information, to be specific, the three-dimensional RGB component (the visible light image data) and the one-dimensional IR component (the infrared image data). However, as shown in FIG. 2*a*, FIG. 2*b*, FIG. 3*a*, and FIG. 3*b*, the R component, the G component, and the B component are completely separated from the IR component on all pixels. This is a prerequisite for performing the image fusion method provided in this application.

Because the visible light image data and the infrared image data are obtained by down-sampling based on the original image data, a resolution of the obtained visible light image and a resolution of an obtained infrared image are lower than that of an original image. A resolution of the RGBIR sensor that is higher than the target resolutions of the visible light image and the infrared image may be selected. In this way, a visible light image and an infrared image that have ideal resolution may be obtained. For example, an RGBIR sensor having a resolution of 2H×2 W is used to obtain a visible light image and an infrared image that have a resolution of H×W. When a high-resolution RGBIR sensor is used to obtain a visible light image and an infrared image that have a low resolution, a super-resolution calculation step may be omitted. This not only can resolve a problem that an edge of an image is blurry caused by a super-resolution algorithm, but also can simplify an image processing process. It should be noted that the resolution of the visible light image and the resolution of the infrared image may alternatively be improved by using another method, for example, the super-resolution algorithm. This is not specifically limited in this application.

The initial visible light exposure parameter and the luminous intensity of the infrared illuminator are usually obtained based on previous settings, historical empirical data, default settings, or the like. Therefore, the initial visible light exposure parameter and the luminous intensity of the infrared illuminator may not completely meet a requirement of a current imaging scenario. In this application, the two types of parameters may be adjusted according to the following steps, to obtain a high-quality target image.

Step 602: Obtain a luminance of the visible light image based on the first original image data.

The terminal device may separate the visible light image data from the first original image data, obtain the visible light image based on the visible light image data, and then divide the visible light image into image blocks, for example, divide the visible light image into m×n or m×m image blocks based on a fixed size.

For each image block, the terminal device may obtain original image data (a portion of data corresponding to the image block in the first original image data) of the image block, and calculate luminance based on RGrGbB of each pixel in a corresponding image block in the original image data of the image block. The luminance is usually calculated based on a GrGb component, to be specific, the luminance of the image block is obtained by calculating an average value of luminance of these pixels. In addition to calculating luminance at a granularity of each pixel, the terminal device may also use another pixel granularity, for example, RGrGbB of each pixel, RGrGbB of one of every two pixels, or RGrGbB of one pixel selected from every n pixels. The terminal device may also obtain luminance of each image block by using a histogram of the visible light image.

The terminal device may set a weight for different image blocks. For example, the terminal device may set a high weight for an interested image block, and then perform weighted averaging (that is, multiply the luminance of each image block by the weight of the image block, add luminance, and then calculate an average value) on luminance of all image blocks to obtain the luminance of the visible light image.

It should be noted that, in this application, the visible light image may be divided into image blocks by using another method. The luminance of each image block in the visible light image may be calculated by using another method. The weight of each image block may be set by using another method, for example, a high weight may be set for the image block of the luminance. Alternatively, the luminance of the visible light image may be calculated by using another method, for example, the luminance of the visible light image may be obtained by directly averaging the luminance of the image blocks. The method is not specifically limited in this application.

Step 603: Adjust the visible light exposure parameter based on a first difference.

The first difference is a difference between the luminance of the visible light image and a preset target luminance of the visible light image. Setting the target luminance of the visible light image provides a convergence condition for an automatic exposure (AE) algorithm. The target luminance of the visible light image is an optimal luminance expected to be achieved by the visible light image. The value may be set based on empirical data, or may be set based on big data statistics. This is not specifically limited. Generally, a higher target luminance of the visible light image indicates higher luminance of the visible light image obtained after the visible light exposure parameter is adjusted.

A process of adjusting the visible light exposure parameter by the terminal device may be a repeated process. If the convergence condition for the AE algorithm is not met by adjusting the visible light exposure parameter once, the visible light exposure parameter needs to be continuously adjusted until the convergence condition for the AE algorithm is met. The convergence condition for the AE algorithm means that an absolute value of the first difference falls within a specified first range. One representation method is that the absolute value of the first difference is less than a specified threshold, for example, (first difference |<X, where X is the specified threshold. Another representation method is that the first difference falls within a specified range, for example, x<first difference <y, where x and y are upper and lower limits of the first range, x is a negative number, y is a positive number, and absolute values of x and y may be equal or unequal. Therefore, the convergence condition for the AE algorithm is a prerequisite for the terminal device to determine whether to adjust the visible light exposure parameter. The terminal device may adjust the visible light exposure parameter, provided that the first difference does not meet the convergence condition for the AE algorithm.

The terminal device may adjust the visible light exposure parameter by using the following method: determining whether an exposure parameter allocation policy set includes an exposure parameter allocation policy corresponding to the first difference; if the exposure parameter allocation policy set includes the exposure parameter allocation policy corresponding to the first difference, adjusting the visible light exposure parameter based on the exposure parameter allocation policy corresponding to the first difference; and if the exposure parameter allocation policy set does not include the exposure parameter allocation policy corresponding to the first difference, adding a new exposure parameter allocation policy, and adjusting the visible light exposure parameter based on the new exposure parameter allocation policy.

The AE algorithm may include two exposure parameter allocation policy sets: a common exposure parameter allocation policy set and an expanded exposure parameter allocation policy set.

Table 1 shows an example of the common exposure parameter allocation policy set. As shown in Table 1, the set includes three exposure parameter allocation policies that respectively correspond to three coefficients. The coefficients are real coefficient values related to exposure. Each exposure parameter allocation policy may include one or more of three components in the visible light exposure parameter: exposure time (IntTime), a system gain (SysGain), and an iris (IrisFNO).

TABLE 1

| Coefficient | IntTime | SysGain | IrisFNO |
|---|---|---|---|
| Coefficient 1 | 100 | 1024 | 0 |
| Coefficient 2 | 40000 | 1024 | 0 |
| Coefficient 3 | 40000 | 2048 | 0 |

The terminal device compares the first difference with the three coefficients in Table 1. The three coefficients are arranged in ascending order. If the first difference is greater than or equal to a coefficient 1 and less than or equal to a coefficient 3, it may be preliminarily determined that the common exposure parameter allocation policy set includes the exposure parameter allocation policy corresponding to the first difference. Then, the terminal device queries for a coefficient corresponding to the first difference in Table 1. If the luminance of the visible light image is higher than the target luminance of the visible light image and exceeds an allowed value, the terminal device adjusts a value (one of the exposure time (IntTime), the system gain (SysGain), or the iris (IrisFNO)) in the visible light exposure parameter to a value of a same parameter in an entry that is above an entry in which the coefficient is located. If the luminance of the visible light image is lower than the target luminance of the visible light image and exceeds the allowed value, the terminal device adjusts a value (one of the exposure time (IntTime), the system gain (SysGain), or the iris (IrisFNO)) in the visible light exposure parameter to a value of a same parameter in an entry that is below an entry in which the coefficient is located.

If the first difference is less than the coefficient 1 or greater than the coefficient 3, it may be determined that the common exposure parameter allocation policy set does not include the exposure parameter allocation policy corresponding to the first difference. The terminal device needs to add a new exposure parameter allocation policy to Table 1 according to a specified rule, and then adjust the visible light exposure parameter based on the new exposure parameter allocation policy. The specified rule may include: if the first difference is less than the coefficient 1, decreasing, based on a proportion, each parameter value corresponding to the coefficient 1, using the parameter value as a parameter value corresponding to the first difference, and adding an entry including the parameter value and the first difference to a position above the coefficient 1 in Table 1. Alternatively, if the first difference is greater than the coefficient 3, increasing, based on the proportion, each parameter value corresponding to the coefficient 3, using the parameter value as the parameter value corresponding to the first difference, and adding an entry including the parameter value and the first difference to a position below the coefficient 3 in Table 1. For example, if the first difference is greater than the coefficient 3, the terminal device adds a row (difference 4, 60000, 2018, 0) below the coefficient 3 in Table 1, and separately uses this group of values as the exposure time (IntTime), the system gain (SysGain), and the iris (IrisFNO) after adjustment. For another example, if the first difference is less than the coefficient 1, the terminal device adds a row (difference 0, 100, 512, 0) above the coefficient 1 in Table 1, and separately uses this group of values as the exposure time (IntTime), the system gain (SysGain), and the iris (IrisFNO) after adjustment.

Table 2 shows an example of the expanded exposure parameter allocation policy set. As shown in Table 2, the set includes five exposure parameter allocation policies that respectively correspond to five coefficients. The coefficients are real coefficient values related to exposure. Each exposure parameter allocation policy may include one or more of three components in the visible light exposure parameter: exposure time (IntTime), a system gain (SysGain), and an iris (IrisFNO). The system gain may further include Again, Dgain, and ISPDgain. Physical meaning of Again refers to an amplification multiple of an analog signal in the sensor. Physical meaning of Dgain refers to an amplification multiple of a digital signal in the sensor. Physical meaning of ISPDgain refers to an amplification multiple of a digital signal outside the sensor.

TABLE 2

| Coefficient | IntTime | Again | Dgain | IspDgain | IrisFNO |
| --- | --- | --- | --- | --- | --- |
| Coefficient 1 | 100 | 1024 | 1024 | 0 | 0 |
| Coefficient 2 | 200 | 1024 | 1024 | 0 | 0 |
| Coefficient 3 | 40000 | 1024 | 1024 | 0 | 0 |
| Coefficient 4 | 40000 | 2048 | 1024 | 0 | 0 |
| Coefficient 5 | 40000 | 4096 | 1024 | 0 | 0 |

The terminal device compares the first difference with the five coefficients in Table 2. The five coefficients are arranged in ascending order. If the first difference is greater than or equal to a coefficient 1 and less than or equal to a coefficient 5, it may be preliminarily determined that the expanded exposure parameter allocation policy set includes the exposure parameter allocation policy corresponding to the first difference. Then, the terminal device queries for a coefficient corresponding to the first difference in Table 2. If the luminance of the visible light image is higher than the target luminance of the visible light image and exceeds an allowed value, the terminal device adjusts a value (one of the exposure time (IntTime), Again, Dgain, ISPDgain, or the iris (IrisFNO)) in the visible light exposure parameter to a value of a same parameter in an entry that is above an entry in which the coefficient is located. If the luminance of the visible light image is lower than the target luminance of the visible light image and exceeds the allowed value, the terminal device adjusts a value (one of the exposure time (IntTime), Again, Dgain, ISPDgain, or the iris (IrisFNO)) in the visible light exposure parameter to a value of a same parameter in an entry that is below an entry in which the coefficient is located.

If there is the first difference (for example, a difference 2), the terminal device may directly read a group of values (200, 1024, 1024, 0, 0) corresponding to the difference 2, and use the group of values as the exposure time (IntTime), Again, Dgain, ISPDgain, and the iris (IrisFNO) after adjustment. If there is no first difference, the terminal device may query in Table 2 for a difference that is closest to the first difference (that is, calculate a difference between the differences listed in Table 2 and the first difference, and take a minimum result), read a group of values corresponding to the minimum value, and use the group of values as the exposure time (IntTime), Again, Dgain, ISPDgain, and the iris (IrisFNO) after adjustment.

If the first difference is less than the coefficient 1 or greater than the coefficient 5, it may be determined that the expanded exposure parameter allocation policy set does not include the exposure parameter allocation policy corresponding to the first difference. The terminal device needs to add a new exposure parameter allocation policy to Table 2 according to a specified rule, and then adjust the visible light exposure parameter based on the new exposure parameter allocation policy. The specified rule may include: if the first difference is less than the coefficient 1, decreasing, based on a proportion, each parameter value corresponding to the coefficient 1, using the parameter value as the parameter value corresponding to the first difference, and adding an entry including the parameter value and the first difference to a position above the coefficient 1 in Table 1; or if the first difference is greater than the coefficient 5, increasing, based on the proportion, each parameter value corresponding to the coefficient 5, using the parameter value as the parameter value corresponding to the first difference, and adding an entry including the parameter value and the first difference to a position below the coefficient 5 in Table 1. For example, if the first difference is greater than the coefficient 5, the terminal device adds a row (difference 6, 60000, 4096, 1024, 0, 0) below the coefficient 5 in Table 2, and separately uses this group of values as the exposure time (IntTime), Again, Dgain, ISPDgain, and the iris (IrisFNO) after adjustment. For another example, if the first difference is less than the coefficient 2, the terminal device adds a row (difference 0, 100, 512, 1024, 0, 0) above the coefficient 1 in Table 1, and separately uses this group of values as the exposure time (IntTime), Again, Dgain, ISPDgain, and the iris (IrisFNO) after adjustment.

Based on the three components of the exposure time (IntTime), the system gain (SysGain), and the iris (IrisFNO) in the visible light exposure parameter, or the five components of the exposure time (IntTime), Again, Dgain, ISPDgain, and the iris (IrisFNO) in the visible light exposure parameter, the terminal device may adjust these parameters in sequence based on an actual application scenario. For example, in a static scenario, the exposure time is first adjusted, then the exposure gain is adjusted, and finally the iris is adjusted. Specifically, the terminal device may first adjust the exposure time. If the convergence condition for the AE algorithm still cannot be met after the exposure time is adjusted, the terminal device may adjust the system gain. If the convergence condition for the AE algorithm still cannot be met after the system gain is adjusted, the terminal device may adjust the iris. It should be understood that, the static scenario means that both an object and a camera are still during imaging, or both the object and the camera are synchronously moving at a same speed and in a same direction. In this case, the object and the camera are relatively still. For another example, in a motion scenario, the exposure gain is first adjusted, then the exposure time is adjusted, and finally the iris is adjusted. It should be understood that, the motion scenario means that the object moves at a high speed during imaging, or the camera moves at a high speed. The high speed or low speed is determined by a user based on empirical data.

It should be noted that the visible light exposure parameter may be adjusted by using another method. This is not specifically limited in this application.

Based on the comparison between the luminance of the visible light image and the target luminance of the visible light image, the terminal device may adjust the visible light exposure parameter in two ways: When the luminance of the visible light image is lower than the target luminance of the visible light image (the first difference is a negative value), the terminal device increases the visible light exposure parameter (the one or more of the exposure time, the iris diameter, or the exposure gain). When the luminance of the visible light image is higher than the target luminance of the visible light image (the first difference is a positive value), the terminal device decreases the visible light exposure parameter (the one or more of the exposure time, the iris diameter, or the exposure gain).

To prevent a single frame from jumping, the terminal device may adjust the visible light exposure parameter only when determining that the first difference between N consecutive frames of visible light images does not meet the convergence condition for the AE algorithm.

Further, when the first difference between the N consecutive frames of visible light images does not meet the convergence condition for the AE algorithm, and luminance of N consecutive frames of visible light images is lower than the target luminance of the visible light image (the first difference is a negative value), the terminal device may increase the one or more of the exposure time, the iris diameter, or the exposure gain. Alternatively, when the first difference between the N consecutive frames of visible light images does not meet the convergence condition for the AE algorithm, and the luminance of the N consecutive frames of visible light images is higher than the target luminance of the visible light image (the first difference is a positive value), the terminal device may decrease the one or more of the exposure time, the iris diameter, or the exposure gain. Because human eyes are sensitive to overexposure, in the foregoing method, N obtained when the first difference is a positive value may be less than N obtained when the first difference is a negative value.

It should be noted that, based on a feature of the RGBIR sensor, the RGB component and the IR component in the original image data can be completely separated. Therefore, when performing steps 602 and 203, the terminal device may ignore the infrared image, and process the visible light image data in the first original image data and the visible light image obtained therefrom. In this case, the luminous intensity of the infrared illuminator does not affect the visible light image. In the following steps, the infrared image data and the infrared image obtained therefrom are processed.

Step 604: Obtain the luminance of the infrared image based on the first original image data.

The terminal device may separate the infrared image data from the first original image data to obtain the infrared image based on the infrared image data, and then divide the infrared image into image blocks, for example, divide the infrared image into m×n or m×m image blocks based on a fixed size.

For each image block, the terminal device may obtain the original image data (a portion of data corresponding to the image block in the first original image data) of the image block, calculate luminance of each pixel of a corresponding image block based on the original image data of the image block, and calculate an average value of luminance of these pixels to obtain the luminance of the image block. In addition to calculating luminance at a granularity of each pixel, the terminal device may also use another pixel granularity, for example, luminance of each pixel, luminance of one of every two pixels, or luminance of one pixel selected from every n pixels. The terminal device may also obtain luminance of each image block by using a histogram of the infrared image.

The terminal device may set a weight for different image blocks. For example, the terminal device may set a high weight for an interested image block, and then perform weighted averaging (that is, multiply the luminance of each image block by the weight of the image block, add luminance, and then calculate an average value) on luminance of all image blocks to obtain the luminance of the infrared image.

It should be noted that, in this application, the infrared image may be divided into image blocks by using another method. The luminance of each image block in the infrared image may be calculated by using another method. The weight of each image block may be set by using another method, for example, a high weight may be set for the image block of the luminance. Alternatively, the luminance of the infrared image may be calculated by using another method, for example, the luminance of the infrared image may be obtained by directly averaging the luminance of the image blocks. The method is not specifically limited in this application.

Step 605: Adjust the luminous intensity of the infrared illuminator based on a second difference.

The second difference is a difference between the luminance of the infrared image and a preset target luminance of the infrared image. Setting the target luminance of the infrared image provides a convergence condition for an automatic exposure (AE) algorithm. The target luminance of the infrared image is optimal luminance expected to be achieved by the infrared image. The value may be set based on empirical data, or may be set based on big data statistics. This is not specifically limited. Generally, a higher target luminance of the infrared image indicates higher luminance of an infrared image obtained after the luminous intensity of the infrared illuminator is adjusted.

A process of adjusting the luminous intensity of the infrared illuminator by the terminal device may be a repeated process. If the convergence condition for the AE algorithm is not met by adjusting the luminous intensity of the infrared illuminator once, the luminous intensity of the infrared illuminator needs to be continuously adjusted until the convergence condition for the AE algorithm is met. The convergence condition for the AE algorithm means that an absolute value of the second difference falls within a specified first range. One representation method is that the absolute value of the second difference is less than a specified threshold, for example, |second difference <X, where X is the specified threshold. Another representation method is that the second difference falls within a specified range, for example, x<second difference <y, where x and y are upper and lower limits of the first range, x is a negative number, y is a positive number, and absolute values of x and y may be equal or unequal. Therefore, the convergence condition for the AE algorithm is a prerequisite for the terminal device to determine whether to adjust the luminous intensity of the infrared illuminator. The terminal device may adjust the luminous intensity of the infrared illuminator, provided that the second difference does not meet the convergence condition for the AE algorithm.

Based on the comparison between the luminance of the infrared image and the target luminance of the infrared image, the terminal device may adjust the luminous intensity of the infrared illuminator in two directions: When the luminance of the infrared image is lower than the target luminance of the infrared image, the terminal device increases the luminous intensity of the infrared illuminator. When the luminance of the infrared image is higher than the target luminance of the infrared image, the terminal device decreases the luminous intensity of the infrared illuminator.

The terminal device may adjust the luminous intensity of the infrared illuminator by adjusting a duty cycle of pulse width modulation (PWM) of the infrared illuminator. If the luminous intensity of the infrared illuminator needs to be increased, the duty cycle of the PWM of the infrared illuminator may be decreased. If the luminous intensity of the infrared illuminator needs to be decreased, the duty cycle of the PWM of the infrared illuminator may be increased.

It should be noted that the luminous intensity of the infrared illuminator may be adjusted by using another method. This is not specifically limited in this application.

To prevent a single frame from jumping, the terminal device may adjust the luminous intensity of the infrared illuminator only when determining that second difference between M consecutive frames of infrared images does not meet the convergence condition for the AE algorithm.

Further, when the second difference between the M consecutive frames of infrared images does not meet the convergence condition for the AE algorithm, and the luminance of M consecutive frames of infrared images is lower than the target luminance of the infrared image (the second difference is a negative value), the terminal device may increase the luminous intensity of the infrared illuminator. Alternatively, when the second difference between the M consecutive frames of visible light images does not meet the convergence condition for the AE algorithm, and the luminance of the N consecutive frames of infrared images is higher than the target luminance of the infrared image (the second difference is a positive value), the terminal device may decrease the luminous intensity of the infrared illuminator. Because human eyes are sensitive to overexposure, in the foregoing method, M obtained when the second difference is a positive value may be less than M obtained when the second difference is a negative value.

It should be noted that, based on a feature of the RGBIR sensor, the RGB component and the IR component in the original image data can be completely separated. Therefore, when performing steps 604 and 605, the terminal device may process the infrared image data in the first original image data and the infrared image obtained therefrom. In this case, adjustment of the luminous intensity of the infrared illuminator is a completely independent process, does not affect the adjusted visible light exposure parameter, and is not affected by the RGB component in the original image data.

Step 606: Obtain second original image data, where the second original image data is captured by using the image sensor based on an adjusted visible light exposure parameter and an adjusted luminous intensity of the infrared illuminator.

After adjustment in steps 602 to 605, the terminal device may obtain the visible light exposure parameter and the luminous intensity of the infrared illuminator that meet the convergence condition for the AE algorithm. In this case, the terminal device may set the RGBIR sensor based on the visible light exposure parameter that meets the convergence condition for the AE algorithm, set the infrared illuminator based on the luminous intensity of the infrared illuminator that meets the convergence condition for the AE algorithm, and then capture the second original image data by using the RGBIR sensor.

Step 607: Fuse, based on the visible light image data and the infrared image data in the second original image data, to obtain a target image.

The terminal device separates the visible light image data and the infrared image data from the second original image data, obtains the visible light image based on the visible light image data, obtains the infrared image based on the infrared image data, and fuses the visible light image and the infrared image to obtain the target image. Because the visible light exposure parameter and the luminous intensity of the infrared illuminator are adaptively set in the foregoing steps, a high-quality fused image may be obtained by capturing only one RGBIR image. Image fusion steps are simplified and efficiency is improved in comparison with a high-quality fused image that is obtained by capturing multiple RGBIR images in the conventional technology.

In an aspect, in this application, an ultra-high-resolution RGBIR sensor may be used to obtain an image, the image may be down-sampled to obtain a high-resolution visible light image and a high-resolution infrared image, and the two high-resolution images may be fused to obtain a target image with a better signal-to-noise ratio and better details. The high-resolution RGBIR sensor may be used to obtain a high-resolution image, the high-resolution image may be down-sampled to obtain a low-resolution image, a super-resolution algorithm may be performed for the low-resolution image to obtain a high-resolution visible light image and a high-resolution infrared image, and the two high-resolution images may be fused to obtain a target image with a better signal-to-noise ratio and better details. In addition to the new RGBIR sensor, a traditional RGBIR sensor may be further used in this application. However, a splitter needs to be added between the lens and the RGBIR sensor, to separate a visible light component and an infrared component as much as possible.

In the other aspect, the visible light image is obtained by setting the visible light exposure parameter that meets the convergence condition for the AE algorithm, the infrared image is obtained by setting the luminous intensity of the infrared illuminator that meets the convergence condition for the AE algorithm, and the visible light image and the infrared image are obtained based on simultaneously-captured original image data, so that blurring in the fused target image can be eliminated.

In this application, the first original image data may be captured based on the initial visible light exposure parameter and the luminous intensity of the infrared illuminator, the visible light exposure parameter and the luminous intensity of the infrared illuminator may be separately adjusted based on the visible light component and the infrared component in the first original image data, and the two adjustment processes are independent of each other and are not affected by the other. This not only improves the adjustment efficiency, but also obtains the target image with a better signal-to-noise ratio and better details, and eliminates blurring in the fused target image. In addition, after the visible light exposure parameter and the luminous intensity of the infrared illuminator are adjusted, only one original image including visible light and infrared light may be captured and fused to obtain the high-quality target image. This improves image obtaining efficiency.

FIG. 8 is an example of a schematic diagram of a structure of an image obtaining apparatus according to an embodiment of this application. As shown in FIG. 8, the apparatus in this embodiment may include a first obtaining module 801, a first processing module 802, a second processing module 803, a second obtaining module 804, and a fusion module 805. The first obtaining module 801 is configured to obtain first original image data, where the first original image data is captured by using an image sensor based on an initial visible light exposure parameter and luminous intensity of an infrared illuminator, and the first original image data includes visible light image data and infrared image data. The first processing module 802 is configured to obtain a luminance of a visible light image based on the first original image data, and adjust the visible light exposure parameter based on a first difference, where the first difference is a difference between the luminance of the visible light image and a preset target luminance of the visible light image. The second processing module 803 is configured to obtain a luminance of an infrared image based on the first original image data, and adjust the luminous intensity of the infrared illuminator based on a second difference, where the second difference is a difference between the luminance of the infrared image and a preset target luminance of the infrared image. The second obtaining module 804 is configured to obtain second original image data, where the second original image data is captured by using the image sensor based on an adjusted visible light exposure parameter and an adjusted luminous intensity of the infrared illuminator. The fusion module 805 is configured to fuse, based on the visible light image data and the infrared image data in the second original image data, to obtain a target image. It should be understood that, in a possible implementation, the first obtaining module and the second obtaining module may be physically a same obtaining module. For example, both the first obtaining module and the second obtaining module may be transmission interfaces of a processor chip. The transmission interfaces are configured to receive and send data.

In a possible implementation, the first processing module 802 is specifically configured to: if an absolute value of the first difference falls outside of a preset first range, adjust the visible light exposure parameter based on the first difference.

In a possible implementation, the first processing module 802 is specifically configured to: determine whether an exposure parameter allocation policy set includes an exposure parameter allocation policy corresponding to the first difference; if the exposure parameter allocation policy set includes the exposure parameter allocation policy corresponding to the first difference, adjust the visible light exposure parameter based on the exposure parameter allocation policy corresponding to the first difference; and if the exposure parameter allocation policy set does not include the exposure parameter allocation policy corresponding to the first difference, add a new exposure parameter allocation policy, and adjust the visible light exposure parameter based on the new exposure parameter allocation policy.

In a possible implementation, the visible light exposure parameter includes one or more of exposure time, an iris diameter, or an exposure gain; and the first processing module 802 is specifically configured to: when the luminance of the visible light image is lower than the target luminance of the visible light image, increase the one or more of the exposure time, the iris diameter, or the exposure gain; or when the luminance of the visible light image is higher than the target luminance of the visible light image, decrease the one or more of the exposure time, the iris diameter, or the exposure gain.

In a possible implementation, the second processing module 803 is specifically configured to: if an absolute value of the second difference falls outside of a preset second range, adjust the luminous intensity of the infrared illuminator based on the second difference.

In a possible implementation, the second processing module 803 is specifically configured to: when the luminance of the infrared image is lower than the target luminance of the infrared image, increase the luminous intensity of the infrared illuminator; or when the luminance of the infrared image is higher than the target luminance of the infrared image, decrease the luminous intensity of the infrared illuminator.

In a possible implementation, the second processing module 803 is specifically configured to: increase the luminous intensity of the infrared illuminator by decreasing a duty cycle of pulse width modulation PWM of the infrared illuminator; or decrease the luminous intensity of the infrared illuminator by increasing the duty cycle of the PWM of the infrared illuminator.

In a possible implementation, the first processing module 802 is specifically configured to: if an absolute value of the first difference between N consecutive frames of visible light images falls outside the first range, adjust the visible light exposure parameter based on the first difference, where N is a positive integer.

In a possible implementation, the first processing module 802 is specifically configured to: when the luminance of the N consecutive frames of visible light images is lower than the target luminance of the visible light image, increase the one or more of the exposure time, the iris diameter, or the exposure gain; or when the luminance of the N consecutive frames of visible light images is higher than the target luminance of the visible light image, decrease the one or more of the exposure time, the iris diameter, or the exposure gain.

In a possible implementation, the second processing module 803 is specifically configured to: if an absolute value of the second difference between M consecutive frames of infrared images falls outside the preset second range, adjust the luminous intensity of the infrared illuminator based on the second difference, where M is a positive integer.

In a possible implementation, the second processing module 803 is specifically configured to: when luminance of the M consecutive frames of infrared images is lower than the target luminance of the infrared image, increase the luminous intensity of the infrared illuminator; or when luminance of the M consecutive frames of infrared images is higher than the target luminance of the infrared image, decrease the luminous intensity of the infrared illuminator.

In a possible implementation, the first processing module 802 is specifically configured to: in a static scenario, first increase the exposure time, then increase the exposure gain, and finally increase the iris diameter; in a motion scenario, first increase the exposure gain, then increase the exposure time, and finally increase the iris diameter; in the static scenario, first decrease the exposure time, then decrease the exposure gain, and finally decrease the iris diameter; and in the motion scenario, first decrease the exposure gain, then decrease the exposure time, and finally decrease the iris diameter. In a possible implementation, the image obtaining apparatus may further include an image capture module. For example, the image capture module may be the image sensor, for example, an RGBIR sensor, an RGBW sensor, or an RGBC sensor. The image capture module may also be a camera.

The apparatus in this embodiment may be configured to execute the technical solutions of the method embodiment shown in FIG. 6. Implementation principles and technical effects are similar. Details are not described herein again.

In an implementation process, steps of the foregoing method embodiments may be completed by using a hardware integrated logical circuit in the processor, or by using instructions in a form of software. The processor may be a general-purpose processor, a digital signal processor (DSP), an application-specific integrated circuit (ASIC), a field programmable gate array (FPGA) or another programmable logic device, a discrete gate or transistor logic device, or a discrete hardware component. The general-purpose processor may be a microprocessor, or the processor may be any conventional processor or the like. The steps of the methods disclosed with reference to embodiments of this application may be directly performed by a hardware encoding processor, or may be performed by using a combination of hardware and a software module in an encoding processor. The software module may be located in a mature storage medium in the art, such as a random access memory, a flash memory, a read-only memory, a programmable read-only memory, an electrically erasable programmable memory, or a register. The storage medium is located in a memory, and the processor reads information in the memory and completes the steps in the foregoing methods in combination with the hardware of the processor.

The memory in the foregoing embodiments may be a volatile memory or a nonvolatile memory, or may include both a volatile memory and a nonvolatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM) used as an external buffer. Through examples but not limitative descriptions, many forms of RAMs may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM), and a direct Rambus dynamic random access memory (DR RAM). It should be noted that the memory of the system and method described in this specification includes but is not limited to these memories and any memory of another proper type.

A person of ordinary skill in the art may be aware that, units and algorithm steps in examples described with reference to embodiments disclosed in this specification can be implemented by electronic hardware or a combination of computer software and electronic hardware. Whether functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in another manner. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in an electrical form, a mechanical form, or another form.

The units described as separate parts may or may not be physically separate, and parts displayed as units may or may not be physical units, may be located in one location, or may be distributed on a plurality of network units. Some or all of the units may be selected based on actual requirements to achieve the objective of the solutions of embodiments.

In addition, functional units in embodiments of this application may be integrated into one processing unit, each of the units may exist alone physically, or two or more units may be integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The computer software product is stored in a storage medium, and includes several instructions for indicating a computer device (which may be a personal computer, a server, or a network device) to perform all or a part of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A method for obtaining an image, comprising:
   obtaining first original image data captured by an image sensor based on an initial visible light exposure parameter and a luminous intensity of an infrared lamp, wherein the first original image data comprises visible light image data and infrared image data;
   obtaining a luminance of a visible light image derived from the first original image data;

adjusting the visible light exposure parameter based on a first difference between the luminance of the visible light image and a target luminance for of the visible light image;

obtaining a luminance of an infrared image derived from the first original image data;

adjusting the luminous intensity of the infrared lamp based on a second difference, between the luminance of the infrared image and a target luminance for the infrared image;

obtaining second original image data captured by the image sensor based on an adjusted visible light exposure parameter and an adjusted luminous intensity of the infrared lamp; and fusing, based on visible light image data and infrared image data in the second original image data, to obtain the image;

wherein the visible light exposure parameter comprises one or more of an exposure time, an iris diameter, or an exposure gain; and adjusting the visible light exposure parameter comprises:
when the luminance of the visible light image is lower than the target luminance for the visible light image, increasing one or more of the exposure time, the iris diameter, or the exposure gain; or when the luminance of the visible light image is higher than the target luminance for the visible light image, decreasing one or more of the exposure time, the iris diameter, or the exposure gain;

wherein increasing one or more of the exposure time, the iris diameter, or the exposure gain comprises:

in a static scenario, first increasing the exposure time, then increasing the exposure gain, and finally increasing the iris diameter; and in a motion scenario, first increasing the exposure gain, then increasing the exposure time, and finally increasing the iris diameter; and decreasing one or more of the exposure time, the iris diameter, or the exposure gain comprises:

in the static scenario, first decreasing the exposure time, then decreasing the exposure gain, and finally decreasing the iris diameter; and in the motion scenario, first decreasing the exposure gain, then decreasing the exposure time, and finally decreasing the iris diameter.

2. The method according to claim 1, wherein adjusting the visible light exposure parameter comprises:
adjusting the visible light exposure parameter based on the first difference when an absolute value of the first difference falls outside a first range.

3. The method according to claim 1, wherein before adjusting the visible light exposure parameter, the method further comprises:
adjusting the visible light exposure parameter based on an exposure parameter allocation policy corresponding to the first difference when an exposure parameter allocation policy set comprises the exposure parameter allocation policy corresponding to the first difference; or adding a new exposure parameter allocation policy, and adjusting the visible light exposure parameter based on the new exposure parameter allocation policy when the exposure parameter allocation policy set does not comprise the exposure parameter allocation policy corresponding to the first difference.

4. The method according to claim 1, wherein adjusting the luminous intensity of the infrared lamp based on the second difference comprises:

adjusting the luminous intensity of the infrared lamp based on the second difference when an absolute value of the second difference falls outside of a second range.

5. The method according to claim 1, wherein adjusting the luminous intensity of the infrared lamp based on the second difference comprises:
when the luminance of the infrared image is lower than the target luminance for the infrared image, increasing the luminous intensity of the infrared lamp; or when the luminance of the infrared image is higher than the target luminance for the infrared image, decreasing the luminous intensity of the infrared lamp.

6. The method according to claim 5, wherein increasing the luminous intensity of the infrared lamp comprises:
increasing the luminous intensity of the infrared lamp by decreasing a duty cycle of pulse width modulation PWM of the infrared lamp; and decreasing the luminous intensity of the infrared lamp comprises:
decreasing the luminous intensity of the infrared lamp by increasing the duty cycle of the PWM of the infrared lamp.

7. The method according to claim 1, wherein adjusting the visible light exposure parameter based on the first difference comprises:
adjusting the visible light exposure parameter based on the first difference between N consecutive frames, wherein N is a positive integer greater than one and when an absolute value of a first difference between the N consecutive frames falls outside of the first range.

8. The method according to claim 7, wherein adjusting the visible light exposure parameter comprises:
when a luminance of the N consecutive frames of visible light images is lower than the target luminance for the visible light image, increasing one or more of the exposure time, the iris diameter, or the exposure gain; or when the luminance of the N consecutive frames of visible light images is higher than the target luminance for the visible light image, decreasing one or more of the exposure time, the iris diameter, or the exposure gain.

9. The method according to claim 1, wherein adjusting the luminous intensity of the infrared lamp based on the second difference comprises:
if an absolute value of the second difference between M consecutive frames of infrared images falls outside of the second range, adjusting the luminous intensity of the infrared lamp based on the second difference, wherein M is a positive integer greater than one.

10. The method according to claim 9, wherein adjusting the luminous intensity of the infrared lamp based on the second difference comprises:
when a luminance of the M consecutive frames is lower than the target luminance for the infrared image, increasing the luminous intensity of the infrared lamp; or when the luminance of the M consecutive frames of infrared images is higher than the target luminance for the infrared image, decreasing the luminous intensity of the infrared lamp.

11. An imaging apparatus, comprising:
a first obtaining module configured to obtain first original image data captured using an image sensor and based on an initial visible light exposure parameter and a luminous intensity of an infrared lamp, wherein the first original image data comprises visible light image data and infrared image data;

one or more processors, configured to execute the obtaining module and to obtain a luminance of a visible light image based on the first original image data, and adjust the visible light exposure parameter based on a first difference between the luminance of the visible light image and a target luminance for the visible light image;

the one or more processors being further configured to obtain a luminance of an infrared image based on the first original image data, and to adjust the luminous intensity of an infrared lamp based on a second difference between the luminance of the infrared image and a target luminance for the infrared image;

the one or more processors being further configured to execute a second obtaining module configured to obtain second original image data captured by the image sensor based on an adjusted visible light exposure parameter and an adjusted luminous intensity of the infrared lamp; and wherein the one or more processors are further configured to execute a fusion module configured to fuse, based on the visible light image data and the infrared image data in the second original image data, to obtain a target image;

wherein the visible light exposure parameter comprises one or more of an exposure time, an iris diameter, or an exposure gain; and adjusting the visible light exposure parameter comprises:

when the luminance of the visible light image is lower than the target luminance for the visible light image, increasing one or more of the exposure time, the iris diameter, or the exposure gain; or when the luminance of the visible light image is higher than the target luminance for the visible light image, decreasing one or more of the exposure time, the iris diameter, or the exposure gain;

wherein increasing one or more of the exposure time, the iris diameter, or the exposure gain comprises:

in a static scenario, first increasing the exposure time, then increasing the exposure gain, and finally increasing the iris diameter; and in a motion scenario, first increasing the exposure gain, then increasing the exposure time, and finally increasing the iris diameter; and decreasing one or more of the exposure time, the iris diameter, or the exposure gain comprises:

in the static scenario, first decreasing the exposure time, then decreasing the exposure gain, and finally decreasing the iris diameter; and in the motion scenario, first decreasing the exposure gain, then decreasing the exposure time, and finally decreasing the iris diameter.

12. The apparatus according to claim 11, wherein the first processor is further configured to:

adjust the visible light exposure parameter based on the first difference when an absolute value of the first difference falls outside a first range.

13. The apparatus according to claim 11, wherein the first processor is further configured to:

adjust the visible light exposure parameter based on an exposure parameter allocation policy corresponding to the first difference when an exposure parameter allocation policy set comprises the exposure parameter allocation policy corresponding to the first difference; or add a new exposure parameter allocation policy, and adjust the visible light exposure parameter based on the new exposure parameter allocation policy when the exposure parameter allocation policy set does not comprise the exposure parameter allocation policy corresponding to the first difference.

14. The apparatus according to claim 11, wherein the visible light exposure parameter comprises one or more of an exposure time, an iris diameter, or an exposure gain; and The one or more processors are further configured to adjust the visible light exposure parameter by:

when the luminance of the visible light image is lower than the target luminance for the visible light image, increasing one or more of the exposure time, the iris diameter, or the exposure gain; or when the luminance of the visible light image is higher than the target luminance for the visible light image, decreasing one or more of the exposure time, the iris diameter, or the exposure gain.

15. The apparatus according to claim 11, wherein the one or more processors are further configured to adjust the luminous intensity of the infrared lamp based on the second difference by:

adjusting the luminous intensity of the infrared lamp based on the second difference when an absolute value of the second difference falls outside of a second range.

16. The apparatus according to claim 11, wherein the one or more processors are further configured to adjust the luminous intensity of the infrared lamp based on the second difference by:

when the luminance of the infrared image is lower than the target luminance for the infrared image, increasing the luminous intensity of the infrared lamp; or when the luminance of the infrared image is higher than the target luminance for the infrared image, decreasing the luminous intensity of the infrared lamp.

17. The apparatus according to claim 16, wherein the one or more processors are further configured to increase the luminous intensity of the infrared lamp by:

increasing the luminous intensity of the infrared lamp by decreasing a duty cycle of pulse width modulation PWM of the infrared lamp; and wherein the one or more processors are further configured to decrease the luminous intensity of the infrared lamp by:

decreasing the luminous intensity of the infrared lamp by increasing the duty cycle of the PWM of the infrared lamp.

18. The apparatus according to claim 11, wherein the one or more processors are further configured to adjust the visible light exposure parameter by:

if an absolute value of a difference between N consecutive frames of visible light images falls outside of the first range, adjusting the visible light exposure parameter based on the difference between the N consecutive frames, wherein N is a positive integer greater than one.

* * * * *

UNITED STATES PATENT AND TRADEMARK OFFICE
CERTIFICATE OF CORRECTION

PATENT NO. : 12,387,451 B2
APPLICATION NO. : 17/886761
DATED : August 12, 2025
INVENTOR(S) : Jiaojiao Tu et al.

Page 1 of 1

It is certified that error appears in the above-identified patent and that said Letters Patent is hereby corrected as shown below:

In the Claims

In Column 31, Claim 1, Line 3, delete "for of" and insert -- for --, therefor.

In Column 31, Claim 1, Line 8, delete "difference," and insert -- difference --, therefor.

In Column 32, Claim 7, Line 29, delete "Nis" and insert -- N is --, therefor.

Signed and Sealed this
Twenty-third Day of December, 2025

John A. Squires
*Director of the United States Patent and Trademark Office*